(12) United States Patent
Adcock et al.

(10) Patent No.: US 9,137,509 B2
(45) Date of Patent: Sep. 15, 2015

(54) SYSTEMS AND METHODS FOR INSTRUCTIONAL VIDEO NAVIGATION AND NOTE TAKING

(71) Applicants: John Adcock, Palo Alto, CA (US); Scott Carter, Palo Alto, CA (US); Matthew Cooper, Palo Alto, CA (US); Laurent Denoue, Palo Alto, CA (US)

(72) Inventors: John Adcock, Palo Alto, CA (US); Scott Carter, Palo Alto, CA (US); Matthew Cooper, Palo Alto, CA (US); Laurent Denoue, Palo Alto, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 342 days.

(21) Appl. No.: 13/647,248

(22) Filed: Oct. 8, 2012

(65) Prior Publication Data

US 2014/0099071 A1  Apr. 10, 2014

(51) Int. Cl.
| | |
|---|---|
| H04N 9/80 | (2006.01) |
| H04N 5/783 | (2006.01) |
| H04N 9/87 | (2006.01) |
| H04N 21/433 | (2011.01) |
| H04N 21/442 | (2011.01) |
| H04N 21/472 | (2011.01) |
| H04N 21/845 | (2011.01) |
| H04N 5/76 | (2006.01) |

(52) U.S. Cl.
CPC .................. *H04N 9/87* (2013.01); *H04N 5/783* (2013.01); *H04N 21/4334* (2013.01); *H04N 21/44218* (2013.01); *H04N 21/47217* (2013.01); *H04N 21/8455* (2013.01); *H04N 21/8456* (2013.01); *H04N 5/76* (2013.01)

(58) Field of Classification Search
USPC .................................................. 386/248–251
See application file for complete search history.

(56) References Cited

U.S. PATENT DOCUMENTS

| | | | | |
|---|---|---|---|---|
| 6,580,870 | B1 * | 6/2003 | Kanazawa et al. | 386/240 |
| 7,031,596 | B2 * | 4/2006 | Sai et al. | 386/241 |
| 7,313,809 | B1 * | 12/2007 | Mohan et al. | 725/109 |
| 8,089,563 | B2 | 1/2012 | Girgensohn et al. | |
| 2009/0304358 | A1 * | 12/2009 | Rashkovskiy et al. | 386/95 |
| 2011/0128440 | A1 * | 6/2011 | Koike | 348/441 |
| 2011/0299832 | A1 | 12/2011 | Butcher | |

OTHER PUBLICATIONS

Jeff Bullas, 50 Awesome YouTube Facts and Figures, http://jeffbullas.com/2011/05/09/50-awesome-youtube-facts-and-figures, 2013, 9 pgs.
Khan Academy, Learn almost anything for free, http://www.khanacademy.org, 2013, 3 pgs.

(Continued)

*Primary Examiner* — Nigar Chowdhury
(74) *Attorney, Agent, or Firm* — Morgan, Lewis & Bockius LLP

(57) ABSTRACT

A method for navigating instructional video presentations is disclosed. The method includes determining a pause mode of a video presentation, and playing the video presentation on a display device. The video presentation has one or more predetermined pause positions. The method also includes, while playing the video presentation, determining that the video presentation has reached one of the one or more pause positions. The method further includes, in accordance with a determination that the video presentation is in a first pause mode, pausing the video presentation at the one of the one or more pause positions and maintaining a display of a paused frame of the video presentation, and, in accordance with a determination that the video presentation is in a second pause mode distinct from the first pause mode, continuing to play the video presentation through the one of the one or more pause positions.

29 Claims, 27 Drawing Sheets

(56) References Cited

OTHER PUBLICATIONS

Dynamic Video Narratives, Proceeding SIGGRAPH '10 ACM SIGGRAPH 2010 papers Article No. 88 ACM New York, NY, USA, 2010, 2 pgs http://vis.cs.ucdavis.edu/~correac/dvn.

Jinlian Guo, AdOn: An Intelligent Overlay Video Advertising System, SIGIR '09, Proceedings of the 32nd international ACM SIGIR conference on Research and development in information retrieval, ACM New York, NY, USA 2009, 2 pgs.

Leanna Lofte, Turn your photos into fun comics with HalfTone for iPhone and iPad http://www.imore.com/2012/03/06/halftone-iphone/, Mar. 6, 2012, 7 pgs.

FXPAL, FX Palo Alto Laboratory, Video Magna, http://www.fxpal.com/?p=manga, 2013, 2 pgs.

ClassX, Interactive Lecture Streaming, Stanford University, 2012, 2 pgs http://classx.stanford.edu.

FXPAL FlySpec http://www.fxpal.com/?p=flyspec, 2013, 2 pgs.

FXPAL IP-09-009: System and Methods for Indexing Slides in Presentation Videos, printed from the internet, May 7, 2013, 2 pgs.

R. D. Dony, J. W. Mateer, J. A. Robinson. Automated Reverse Storyboarding. Proc. First European Conf. on Visual Media Production, Mar. 15-16, 2004, 10 pgs http://www.soe.uoguelph.ca/webfiles/rdony/pubs/Dony04CVMP04.pdf.

Andreas Girgensohn, Adaptive Clustering and Interactive Visualizations to Support the Selection of Video Clips. ICMR 2011, 8 pgs.

Pierre-Yves Laffont "Interactive content-aware zooming" http://www.mendeley.com/research/interactive-contentaware-zooming/, 2013, 2 pgs.

Jonathan Foote, Reach-Through-the-Screen: A New Metaphor for Remote Collaboration, FX Palo Alto Laboratory Inc., 2004, 8 pgs.

Yong Jae Lee, Discovering Important People and Objects for Egocentric Video Summarization, University of Texas at Austin, 2012, 8 pgs http://www.cs.utexas.edu/~grauman/papers/egocentric_cvpr2012.pdf.

Boris Epshtein, Detecting Text in Natural Scenes with Stroke Width Transform, Microsoft Corporation, IEEE, 2010, 8 pgs.

Don Kimber, Trailblazing: Video Playback Control by Direct Object Manipulation, IEEE, 2007, 4 pgs.

Dan B. Goldman, Video Object Annotation, Navigation and Composition on User Interface in UIST '08: Proceedings of the 21st Annual ACM Symposium Software and Technology, Oct. 19-22, 2008, 10 pgs http://www.danbgoldman.com/uw/papers/ivoa.uist08.pdf.

Image Segmentation, Wikipedia, Apr. 20, 2013, 12 pgs.

* cited by examiner

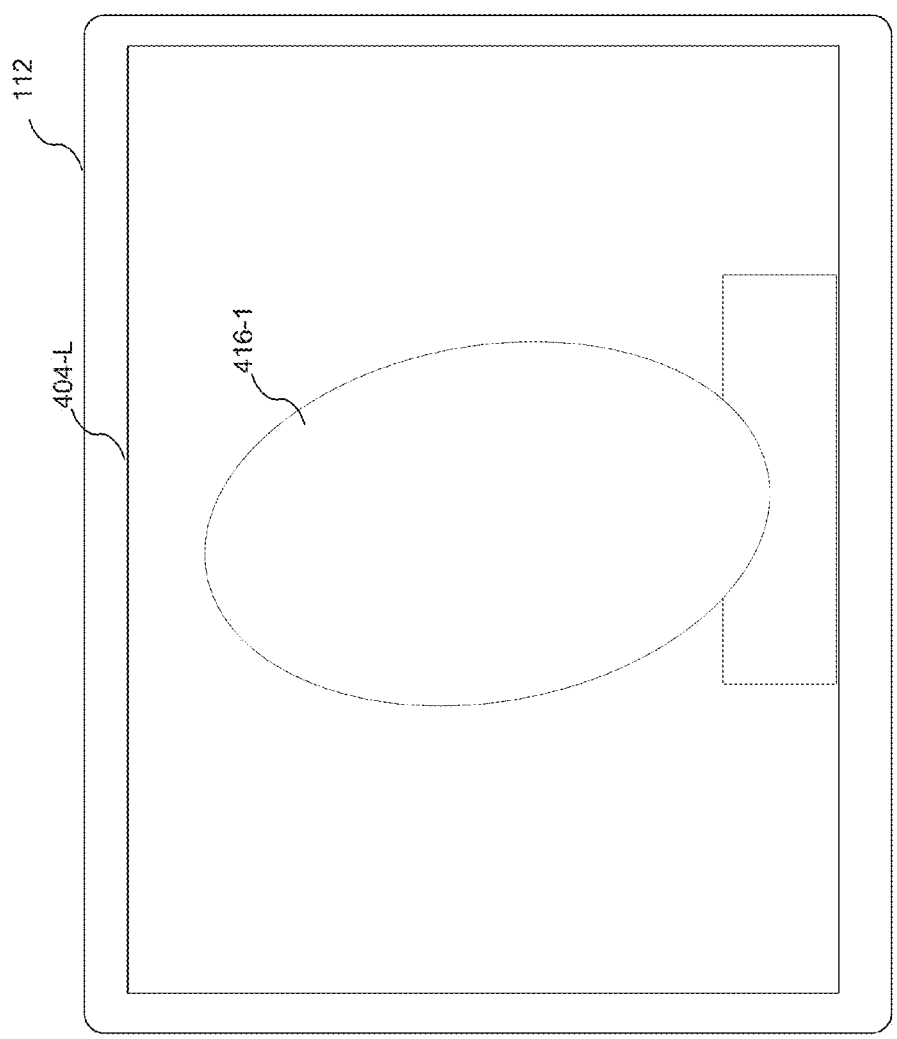

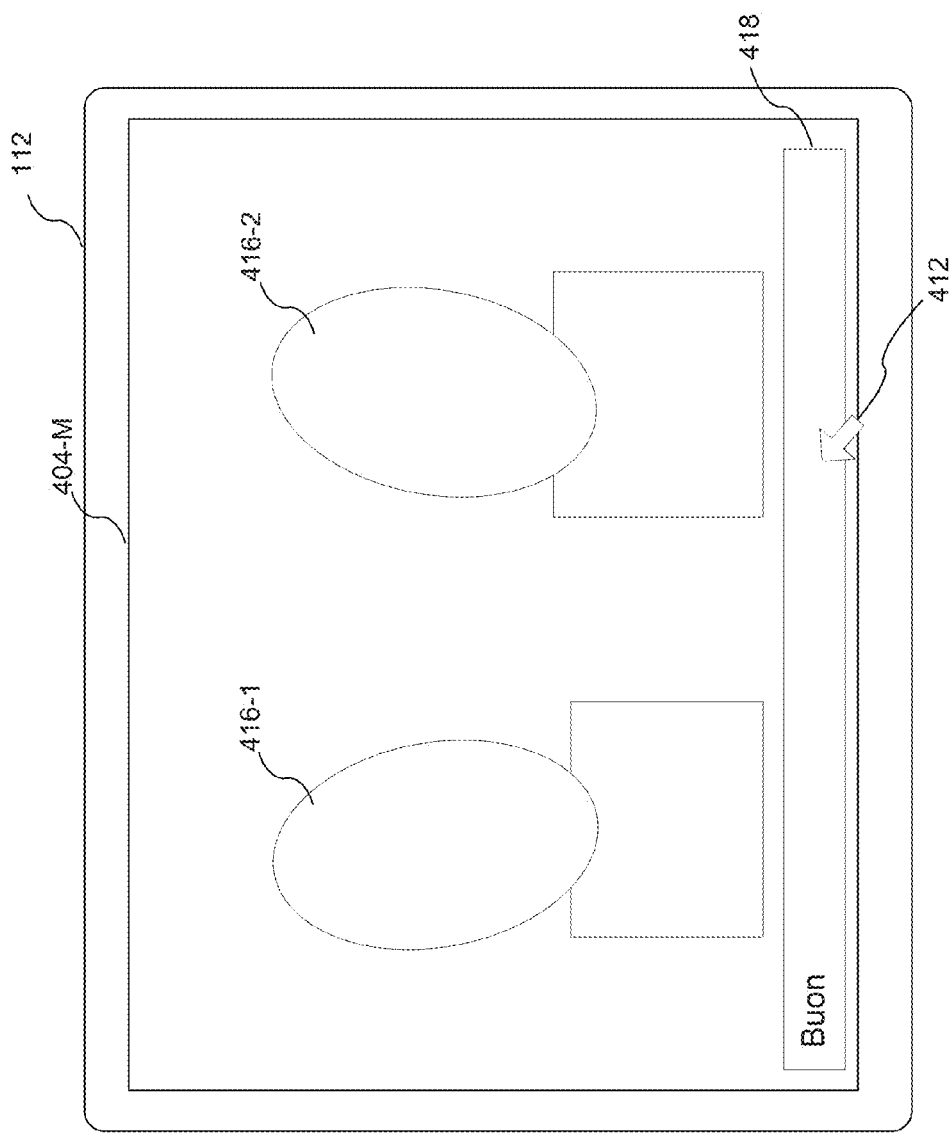

SYSTEMS AND METHODS FOR INSTRUCTIONAL VIDEO NAVIGATION AND NOTE TAKING

TECHNICAL FIELD

The disclosed implementations relate generally to systems and methods for navigating video presentations. More particularly, the disclosed implementations relate to systems and methods for navigating instructional video presentations and note taking for the instructional video presentations.

BACKGROUND

Video players, such as video cassette players, DVD players and software-implemented media players are widely used. Operation of a video player typically includes initiating the video player to display a video, such as a movie, on a television screen, and pausing the video player for, e.g., taking a short break, or reviewing a frame of the video.

However, instructional video presentations require more interaction with users. Existing methods for operating video players are inefficient for playing instructional video presentations. In particular, taking notes while playing instructional video presentations with existing methods is cumbersome. Therefore, there is a need for a new method and system for navigating instructional video presentations and note taking.

SUMMARY

A number of implementations (e.g., of computer systems or devices, and methods of operating such systems or devices) that overcome the limitations and disadvantages described above are presented in more detail below. These embodiments provide methods, systems, and graphical user interfaces (GUIs) for navigating instructional video presentations and note taking.

As described in more detail below, some implementations involve a method performed at a computer system with one or more processors and memory. The method includes determining a pause mode of a video presentation, and playing the video presentation on a display device. The video presentation has one or more predetermined pause positions. The method also includes, while playing the video presentation, determining that the video presentation has reached one of the one or more pause positions. The method further includes, in accordance with a determination that the video presentation is in a first pause mode, pausing the video presentation at the one of the one or more pause positions and maintaining a display of a paused frame of the video presentation, and, in accordance with a determination that the video presentation is in a second pause mode distinct from the first pause mode, continuing to play the video presentation through the one of the one or more pause positions.

In accordance with some implementations, a computer system includes one or more processors, and memory storing one or more programs for execution by the one or more processors. The one or more programs include instructions for determining a pause mode of a video presentation, and playing the video presentation on a display device. The video presentation has one or more predetermined pause positions. The one or more programs also include instructions for, while playing the video presentation: determining that the video presentation has reached one of the one or more pause positions. The one or more programs further include instructions for, in accordance with a determination that the video presentation is in a first pause mode, pausing the video presentation at the one of the one or more pause positions and maintaining a display of a paused frame of the video presentation, and, in accordance with a determination that the video presentation is in a second pause mode distinct from the first pause mode, continuing to play the video presentation through the one of the one or more pause positions.

In accordance with some implementations, a non-transitory computer readable storage medium stores one or more programs for execution by one or more processors of a computer system coupled. The one or more programs include instructions for determining a pause mode of a video presentation, and playing the video presentation on a display device. The video presentation has one or more predetermined pause positions. The one or more programs also include instructions for, while playing the video presentation, determining that the video presentation has reached one of the one or more pause positions. The one or more programs further include instructions for, in accordance with a determination that the video presentation is in a first pause mode, pausing the video presentation at the one of the one or more pause positions and maintaining a display of a paused frame of the video presentation, and, in accordance with a determination that the video presentation is in a second pause mode distinct from the first pause mode, continuing to play the video presentation through the one of the one or more pause positions.

Thus, computer systems are provided with improved methods for navigating instructional video presentations. The methods described herein enabling users to efficiently navigate instructional video presentations.

BRIEF DESCRIPTION OF THE DRAWINGS

For a better understanding of the aforementioned implementations as well as additional aspects and implementations thereof, reference should be made to the Description of Implementations below, in conjunction with the following drawings in which like reference numerals refer to corresponding parts throughout the figures.

Like reference numerals refer to corresponding parts throughout the drawings.

DETAILED DESCRIPTION

Methods and systems for navigating instructional video presentations and note taking are described. Reference will be made to certain implementations, examples of which are illustrated in the accompanying drawings. While the invention will be described in conjunction with the implementations, it will be understood that the implementations are not intended to limit the invention to these particular implementations alone.

Moreover, in the following description, numerous specific details are set forth to provide a thorough understanding of the described implementations. However, it will be apparent to one of ordinary skill in the art that some implementations may be practiced without these particular details. In other instances, methods, procedures, components, and networks that are well-known to those of ordinary skill in the art are not described in detail to avoid obscuring aspects of the implementations described in this document.

Figure 1:
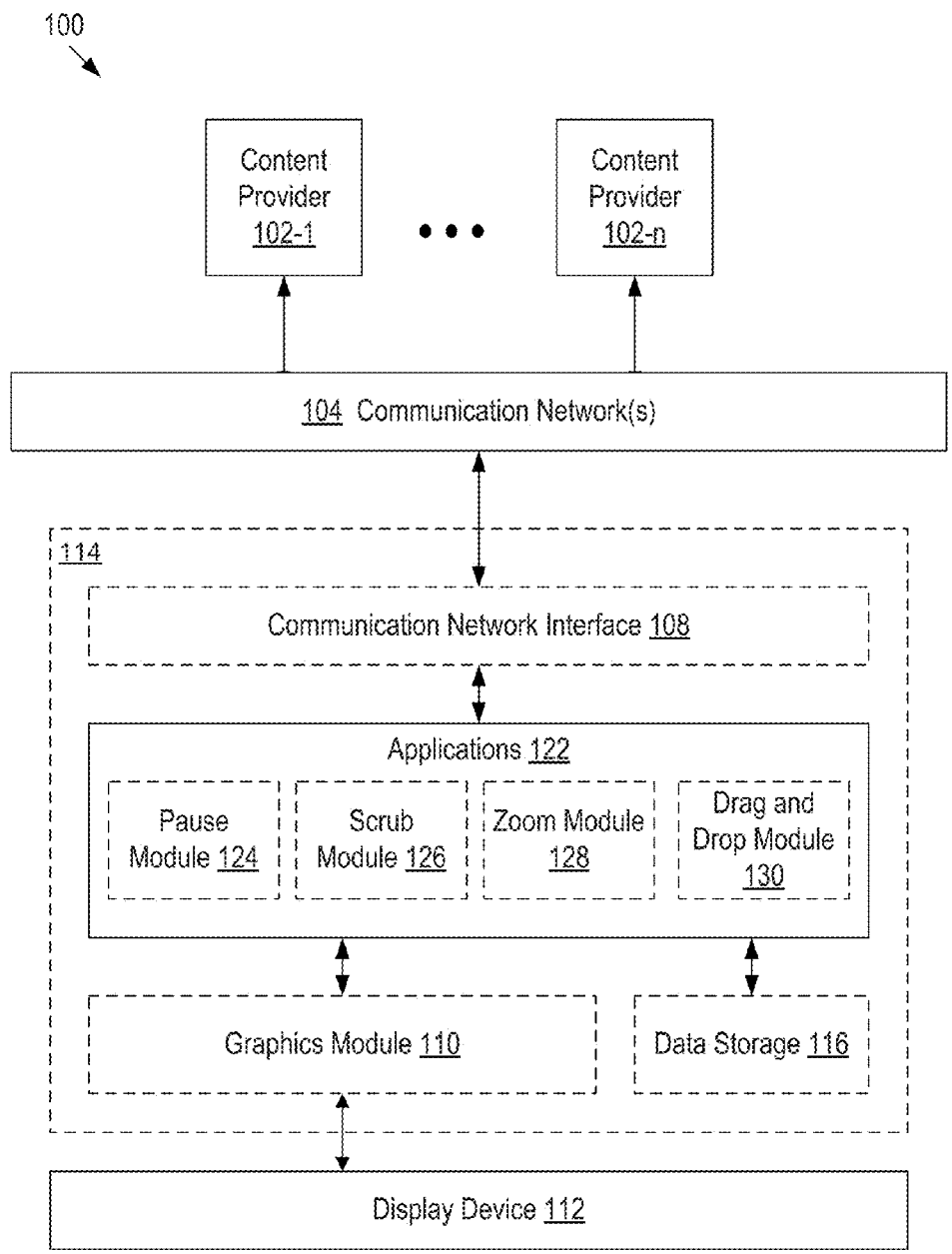
FIG. 1 is a block diagram illustrating an example content distribution system, in accordance with some implementations.

FIG. 1 is a block diagram illustrating an example content distribution system 100, according to certain implementations. In FIG. 1, the system 100 includes one or more content providers 102 and communication networks 104. Connected to the communication networks 104 is a computer system 114 coupled with a display device 112. In some implementations, the computer system 114 is included in a video player. In some implementations, the computer system 114 is a set-top box. Various implementations of the computer system 114 implement the methods described in this document. In some implementations, the display device is a television, a discrete monitor, or an integrated display screen. In other words, in some implementations, the display device 112 is part of the computer system 114.

As used herein, content providers 102 are systems or devices configured to provide media content (e.g., music, television programs, movies, social media data, web data, video presentations, etc.). The content providers 102 can be any of a number of content provider systems, equipment, and/or devices that provide media content (e.g., on-air television broadcasting systems, cable service systems, direct satellite broadcasting systems, Internet television service servers, web servers, digital video recorders, etc.). Typically, the media contents distributed by the content providers 102 include multimedia data (e.g., television programs, movies, instructional video, etc.). In some implementations, the content providers 102 include media servers with media player software that executes on the servers and is configured to manage and play video presentations and send video streams to remote computer systems in response to instructions sent by those computer systems regarding playback of the video presentations.

The content providers 102 distribute media contents via the communication networks 104. The communication networks 104 may include one or more of: radio-frequency communication networks used for on-air or satellite television broadcasting, radio-frequency communication networks used for on-air radio broadcasting, cable-based communication networks, digital audio/video communication networks, the Internet, other wide area networks, local area networks, metropolitan area networks, wireless networks, cellular networks, and so on.

In some implementations, the computer system 114 includes one or more communication network interfaces 108 that are configured for interfacing with one or more communication networks, such as the Internet, other wide area networks, local area networks, metropolitan area networks, wireless networks, cellular networks, and so on.

In some implementations, the computer system 114 stores media content (e.g., on-air television broadcasting systems, cable service systems, direct satellite broadcasting systems, Internet television service servers, web servers, digital video recorders, etc.) in the data storage 116. In some implementations, the data storage 116 includes one or more hard drivers, one or more solid-state storage devices, and/or one or more data servers.

The computer system 114 stores and/or executes applications 122. The applications 122 include application programs used for managing the computer system 114, including, in some implementations, applications for controlling the display on the display device 112. For example, at least one of the applications 122 is configured to receive data from the communication network interface 108 and/or the data storage 116 and send data and instructions to a graphics module 110 for rendering media and program content, including user interfaces and/or user interface objects. In some implementations, the applications 122 include and/or use one or more of: a pause module 124, a scrub module 126, a zoom module 128, and a drag-and-drop module 130.

The graphics module 110 includes one or more display processors or graphics processing units for rendering user interfaces and/or user interface objects. In some implementations, the graphics module 110 receives data from the applications 122 for rendering user interfaces and/or user interface objects. The user interfaces and/or user interface objects rendered by the graphics module 110 are sent to the display device 112 for display.

The computer system 114 may include additional components not illustrated in FIG. 1.

Figure 2:
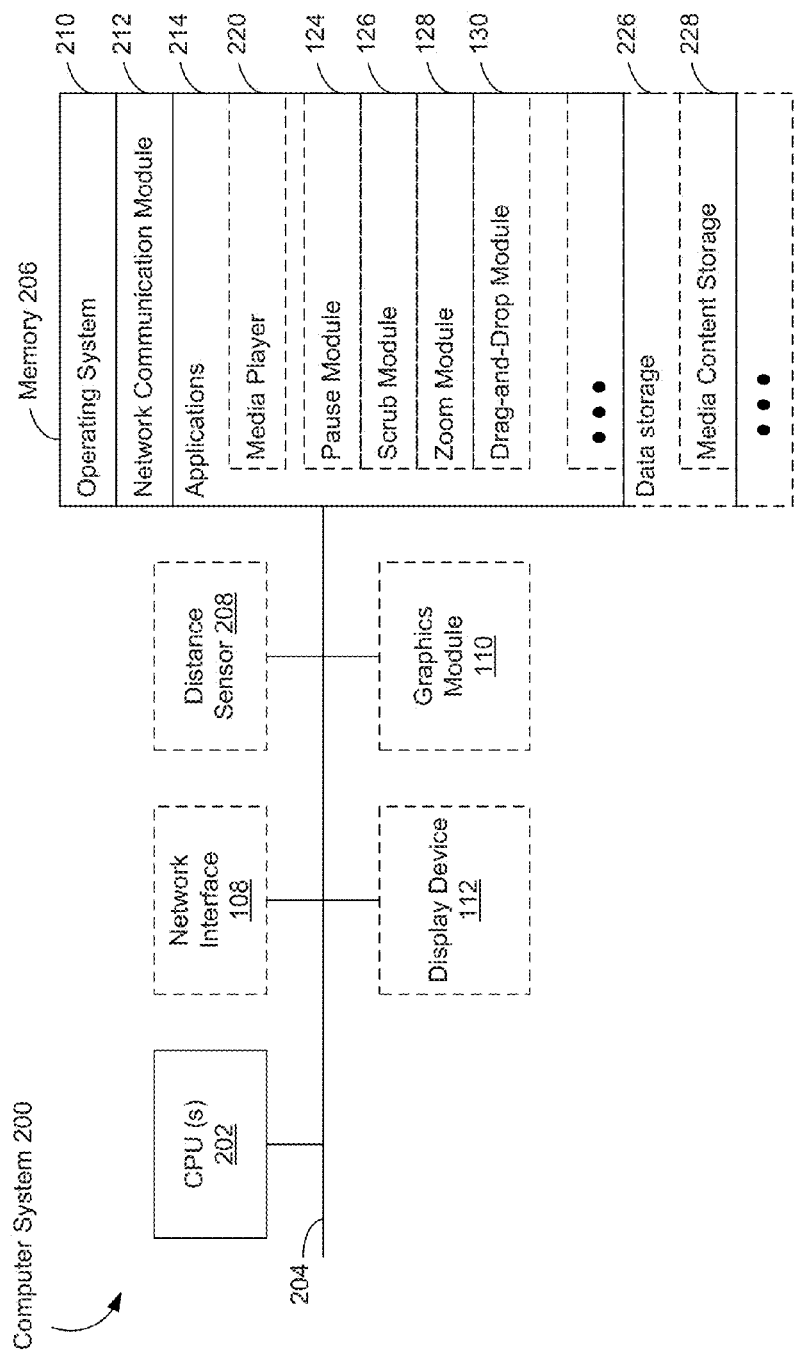
FIG. 2 is a block diagram illustrating a computer system, in accordance with some implementations.

FIG. 2 is a block diagram illustrating a computer system 200 in accordance with some implementations. In some implementations, the computer system 200 corresponds to the computer system 114 (FIG. 1).

The computer system 200 typically includes one or more processing units (CPUs) 202 and memory 206. In some implementations, the computer system 200 also includes one or more of: one or more network or other communications interfaces 108, graphics module 110, and one or more distance sensors 208. The computer system 200 includes one or more communication buses 204 for interconnecting these components. In some implementations, the communication buses 204 include circuitry (sometimes called a chipset) that interconnects and controls communications between system components. In some other implementations, the computer system 200 includes a user interface (not shown) (e.g., a keyboard, and a mouse or other pointing device). The computer system 200 is coupled with the display device 112, regardless of whether the display device 112 is integrated with the computer system 200 or located separate from the computer system 200.

In some implementations, the one or more distance sensors 208 are used to determine a distance between a user of the computer system 200 and the display device 112. In some implementations, the one or more distance sensors 208 include one or more cameras that can monitor the distance between the user of the computer system 200 and the display device 112. In some implementations, the one or more distance sensors 208 include ultrasound sensors or infrared sensors that are used to determine the distance between the user of the computer system 200 and the display device 112. Typically, the one or more distance sensors 208 are activated only with an explicit permission (e.g., an opt-in approval) of the user. In some implementations, the one or more distance sensors 208 are configured to determine a distance between a face of the user and the display device 112.

The memory 206 of the computer system 200 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 206 may optionally include one or more storage devices remotely located from the CPU(s) 202. The memory 206, or alternately the non-volatile memory device(s) within the memory 206, comprises a non-transitory computer readable storage medium. In some implementations, the memory 206 or the computer readable storage medium of the memory 206 stores the following programs, modules and data structures, or a subset thereof:

operating system 210 that includes procedures for handling various basic system services and for performing hardware dependent tasks;

network communication module (or instructions) 212 that is used for connecting the computer system 200 to the content providers (e.g., content providers 102, FIG. 1) via one or more network interfaces 108 and one or more communications networks 104 (FIG. 1), such as the Internet, other wide area networks, local area networks, metropolitan area networks, wireless networks, cellular networks, and so on;

applications 122 that include various applications executed by the one or more processing units 202 causing the computer system 200 to perform certain operations (e.g., a media player 220, which, when executed, displays contents of media data, etc.); and data storage 226 that stores various data used by the computer system 200.

In some implementations, the applications 122 include one or more of: the pause module 124, which includes instructions for performing pause operations; the scrub module 126, which includes instructions for performing scrub operations; the zoom module 128, which includes instructions for performing zoom operations; and the drag-and-drop module 130, which includes instructions for performing drag-and-drop operations.

In some implementations, the data storage 226 includes media content storage 228. The media content storage 228 may store a complete media data for a particular program (e.g., a multimedia data including an entire length of an instructional video, etc.), which may be played at a time desired by a user. Alternatively, the media content storage 228 may store a segment of the complete media data (e.g., a segment of an instructional video). The media content storage 228 may store a portion of a particular program, which may be used for improving the quality of playing the particular program (e.g., for caching or for content analysis for finding related programs and/or services).

In some implementations, the data storage 226 also includes metadata associated with the media data stored in the data storage 226. For example, the metadata may include one or more of: title, author, description, and video presentation type of the media data stored in the data storage 226.

Optionally, the memory 206 may include additional applications, modules, or components. In some implementations, the computer system 200 includes additional components not illustrated in FIG. 2. For example, the computer system 200 may include one or more audio modules for generating and/or amplifying audio signals or audio warnings. The computer system 200 may also include a security module for protecting the data stored in the computer system 200.

Each of the above identified modules and applications corresponds to a set of instructions for performing one or more functions described above. These modules (i.e., sets of instructions) need not be implemented as separate software programs, procedures or modules, and thus various subsets of these modules may be combined or otherwise re-arranged in various implementations. In some implementations, the memory 206 may store a subset of the modules and data structures identified above. Furthermore, the memory 206 may store additional modules and data structures not described above.

Notwithstanding the discrete blocks in FIGS. 1 and 2, these figures are intended to provide functional descriptions of some implementations rather than structural descriptions of functional elements in the implementations. One of ordinary skill in the art will recognize that an actual implementation might have the functional elements grouped or split among various components. In practice, and as recognized by those of ordinary skill in the art, items shown separately could be combined and some items could be separated. For example, in some implementations, the display device 112 is included in the computer system 200. In other implementations, the display device 112 is physically separated from the computer system 200. In some implementations, the CPUs 202 and the memory 206 are included in a single semiconductor package. In some implementations, the CPUs 202 and the graphics module 110 are included in a single semiconductor package. In some implementations, the computer system 200 is implemented on multiple distributed computer systems. In some implementations, one or more of the pause module 124, the scrub module 126, the zoom module 128, and the drag-and-drop module 130 are integrated into the media player 220, and the pause module 124, the scrub module 126, the zoom module 128, and the drag-and-drop module 130 may not exist as separate modules.

The actual number of components used to implement the computer system 200 and how features are allocated among them will vary from one implementation to another, and may depend in part on the amount of data traffic that the system must handle during peak usage periods as well as during average usage periods, and may also depend on the amount of data stored by the computer system 200. Moreover, one or more of the blocks (e.g., the display device 112, etc.) in FIGS. 1 and 2 may be implemented on one or more separate devices designed to provide the described functionality. Although the description herein refers to certain features implemented in the display device 112 and the computer system 200, the implementations are not limited to such distinctions. For example, features described herein as being part of the computer system 200 can be implemented in whole or in part in the display device 112, and vice versa.

Figure 3A:
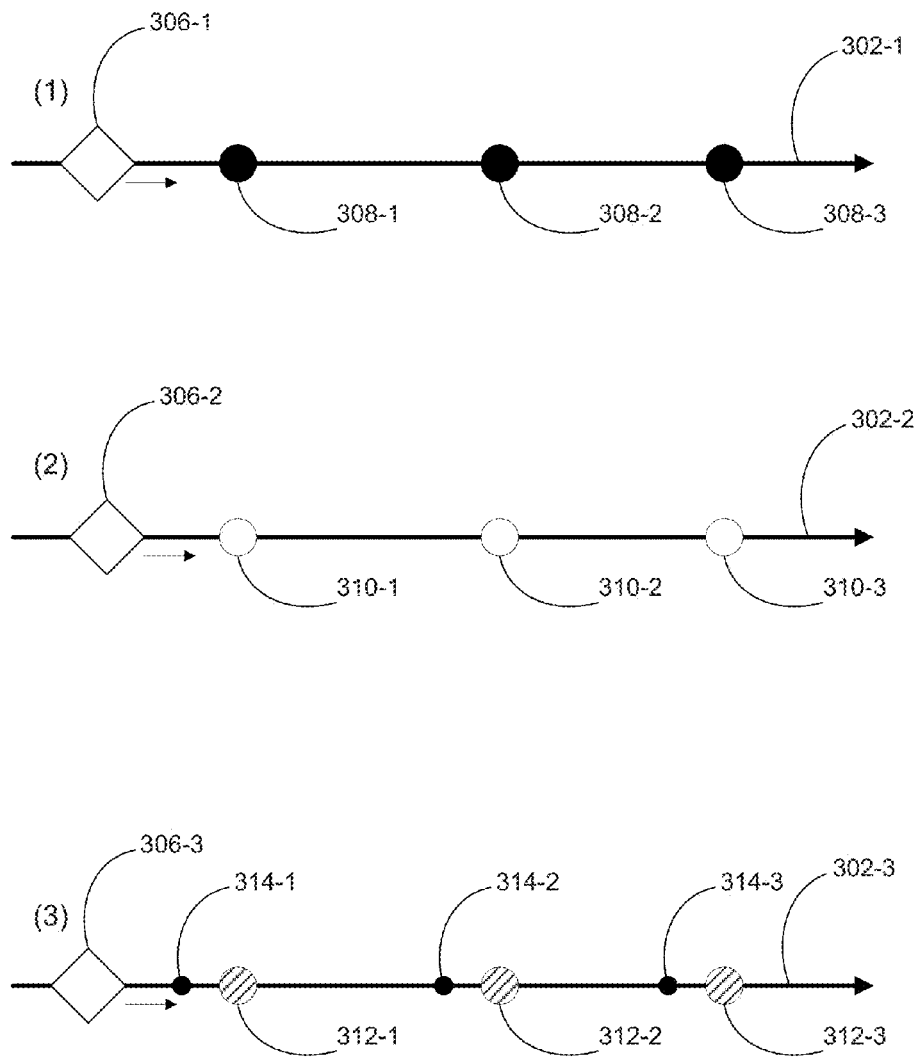
FIG. 3A illustrates operations associated with pause modes in accordance with some implementations.

FIG. 3A illustrate conceptual representations of operations associated with three pause modes in accordance with some implementations. In FIG. 3A, a timeline 302 represents the flow of time as a video presentation is being played. Predetermined pause positions 308 and a current position 306 are also illustrated on each timeline 302. While a video presentation is being played, the current position 306 is considered to move toward the right hand side. Note that the term "predetermined pause position" as used herein means a pause position determined at some time prior to starting playback of a video presentation and/or a pause position determined after starting playback of a video presentation (including before the video playback has reached the pause position). For example, in some implementations, a predetermined pause position is dynamically analyzed and determined during playback.

In the pause mode (1), when the current position 306 reaches one of the predetermined pause positions (i.e., when the temporal position of the playback of the video presentation reaches one of the pause positions), the video presentation automatically pauses. The video presentation will resume when the user initiates resuming the video presentation (e.g., by selecting a resume button).

In the pause mode (2), when the current position 306 reaches one of the predetermined pause positions, the video presentation continues to play through the predetermined pause position. For example, in the pause mode (2), the predetermined pause positions are ignored.

In the pause mode (3), when the current position 306 reaches a pause indication position before one of the predetermined pause positions (e.g., the pause indication position is selected based on a predefined time before the predetermined pause position or a predefined number of frames before the predetermined pause position), an indication of the upcoming pause position is provided. The indication of the upcoming pause position can be an audible indication (e.g., a beep, a music, etc.) and/or a visual indication (e.g., a message on the display, changing the color of the display, displaying an icon, etc.).

In some implementations, the indication requests that the user provide an input if the user wants to pause the video presentation. If the user provides the input, the video presentation is paused. For example, when the current position 306-3 reaches the pause indication position 314-1, an indication is issued requesting that the user provide an input if the user wants to pause the video presentation. If the user provides the input, the video presentation may jump to the pause position 312-1 and pause. Alternatively, if the user provides the input, the video presentation may continue to play the video presentation up to the pause position 312-2 and then pause. If the user does not provide the input, the video presentation continues through the predetermined pause position.

In some implementations, the indication requests that the user provide an input if the user does not want to pause the video presentation. If the user provides the input, the video presentation continues through the predetermined pause position. If the user does not provide the input, the video presentation pauses at the predetermined pause position.

Figure 3B:
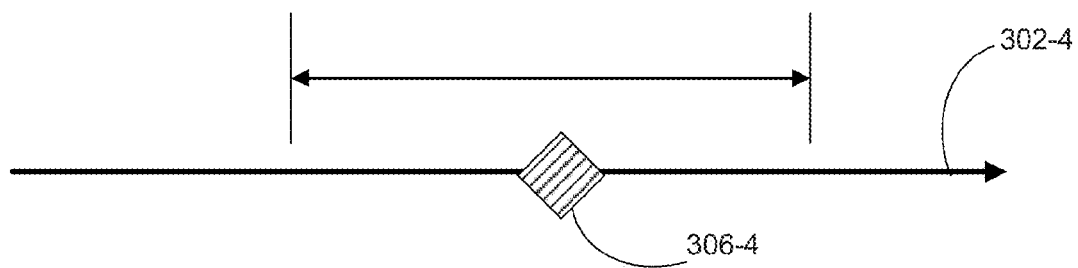
FIG. 3B illustrates operations associated with a selection of a representative frame in accordance with some implementations.

FIG. 3B illustrates operations associated with a selection of a representative frame of a video being presented in accordance with some implementations. In some cases, it may be desirable to select a high quality frame as a representative frame. For example, when a user selects a pause button, the frame that was displayed when the pause button was selected may be blurry and/or occluded, and may not serve as a representative frame. In particular, when a thumbnail image from a representative frame is needed, it is desirable to select a high quality frame that does not have a blurry image or an occlusion. In some implementations, a high quality frame is identified as such based on comparison of one or more image characteristics for the frame (e.g., image sharpness, image contrast, freedom from image artifacts, freedom from occluding objects, etc.) to one or more threshold values associated with those characteristics—individually or in combination.

In some implementations, a high quality image is selected near the frame that was displayed when the pause button was selected. For example, a first number of frames preceding the frame that was displayed when the pause button was selected and a second number of frames subsequent to the frame that was displayed when the pause button was selected are analyzed for selection of the high quality image. In some implementations, each of these frames is scored, and a frame with a highest score is selected as the high quality frame (e.g., a sharper frame than the others, or a frame with fewer occlusions than the others, is selected as the high quality frame). Alternatively, a subset of these frames is scored, and a frame of the subset with a highest score is selected as the high quality frame.

In some implementations, the score is at least partially based on the image sharpness. The methods for measuring the image sharpness are well known in the art, and are not repeated herein for brevity. In some implementations, image sharpness is determined based on comparison to a threshold (e.g., image sharpness being higher than a threshold).

In some implementations, the score for a respective frame is at least partially based on the similarity between the respective frame and the frame that was displayed when the pause button was selected. The similarity between the two frames increases the likelihood that the high quality frame is also representative of the frame that was displayed when the pause button was selected. In some implementations, similarity between frames is determined based on comparison to a threshold (e.g., similarity being higher than a threshold).

Although the method of selecting a high quality image is described above with respect to a user selecting the pause button, analogous methods can be used for predetermined pause positions and computer-generated pause positions. For brevity, these methods are not repeated herein.

Figure 4A:
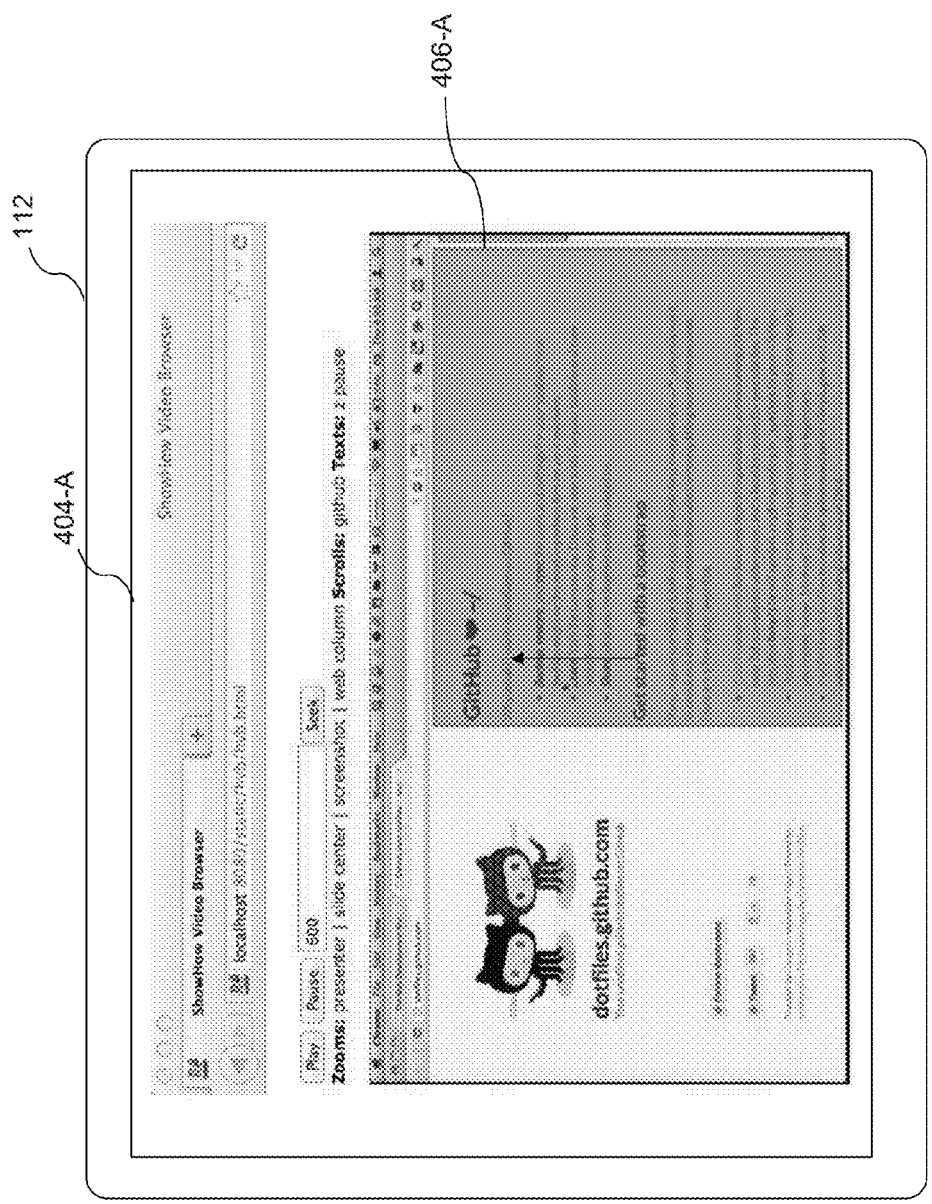
FIGS. 4A-4R illustrate example user interfaces in accordance with some implementations.
Figure 4B:
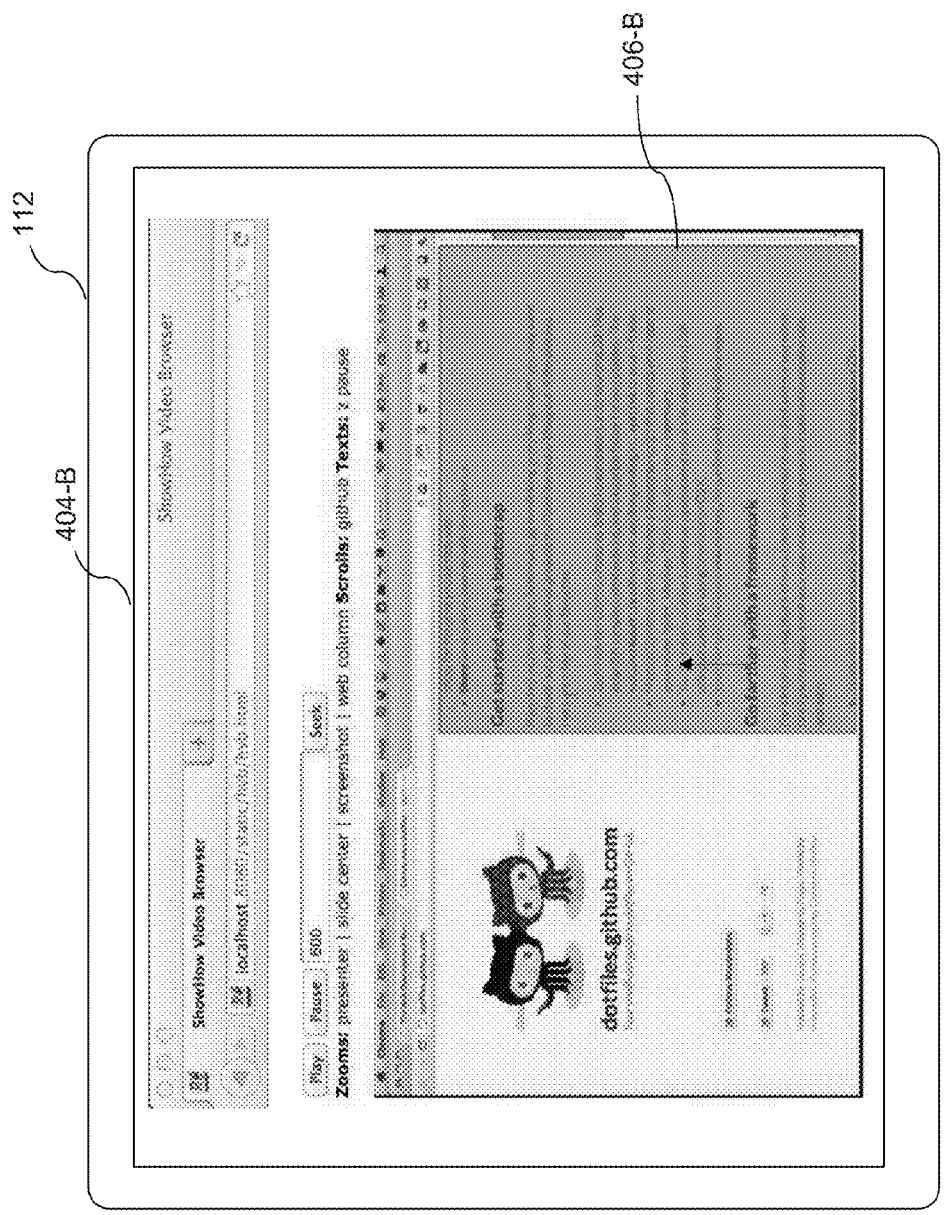
Figure 4C:
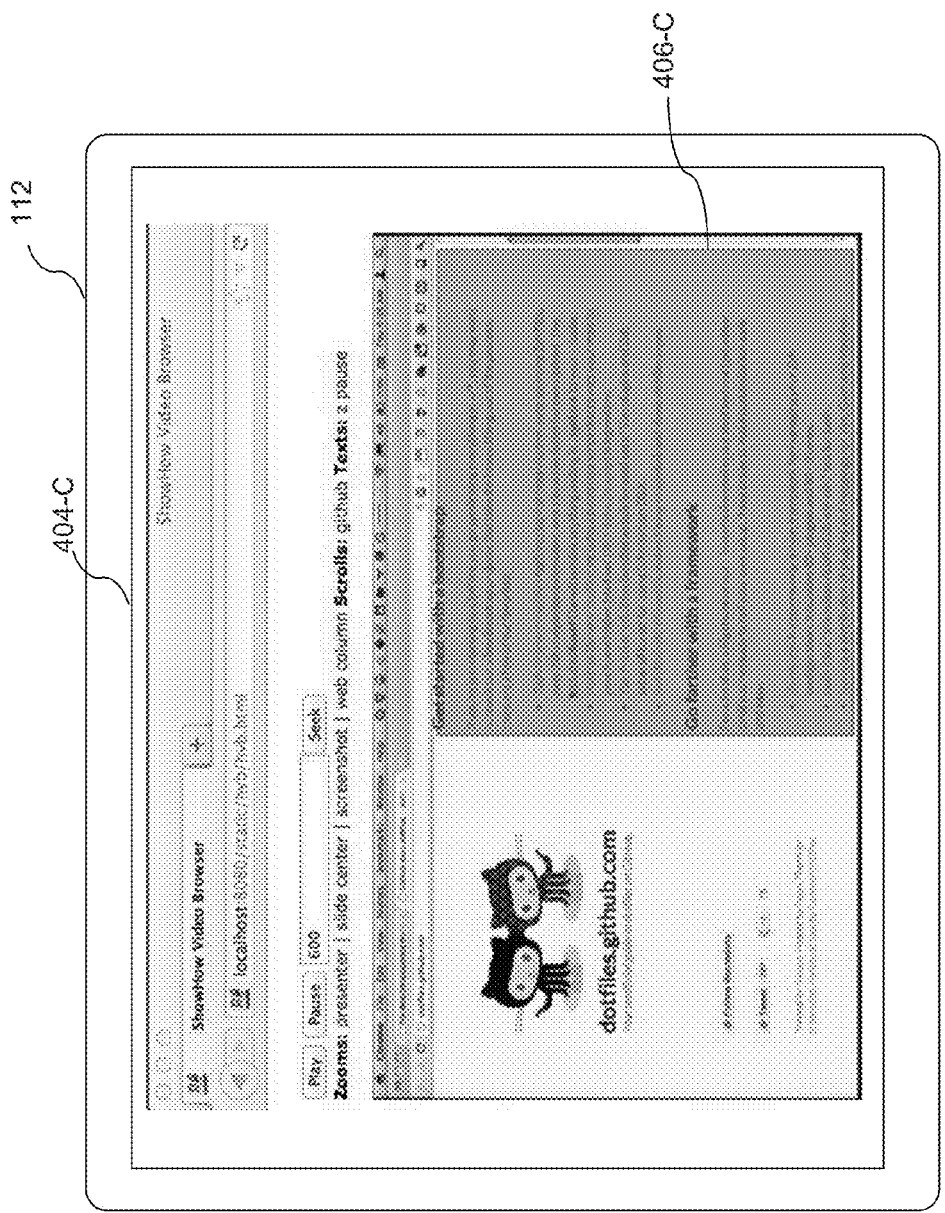
Figure 4D:
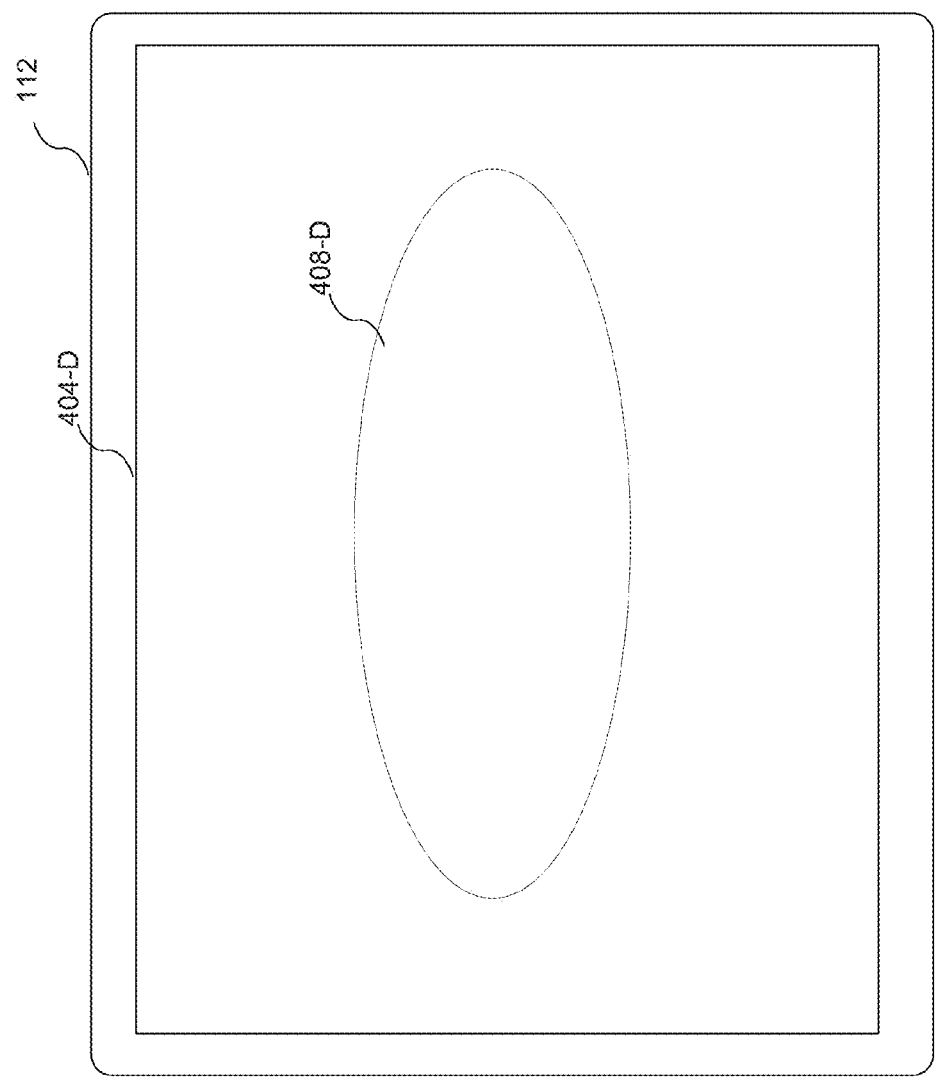
Figure 4D:
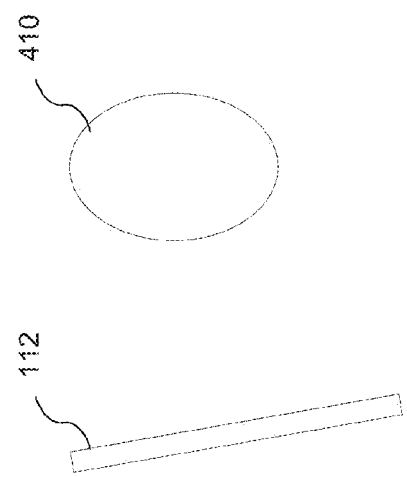
Figure 4E:
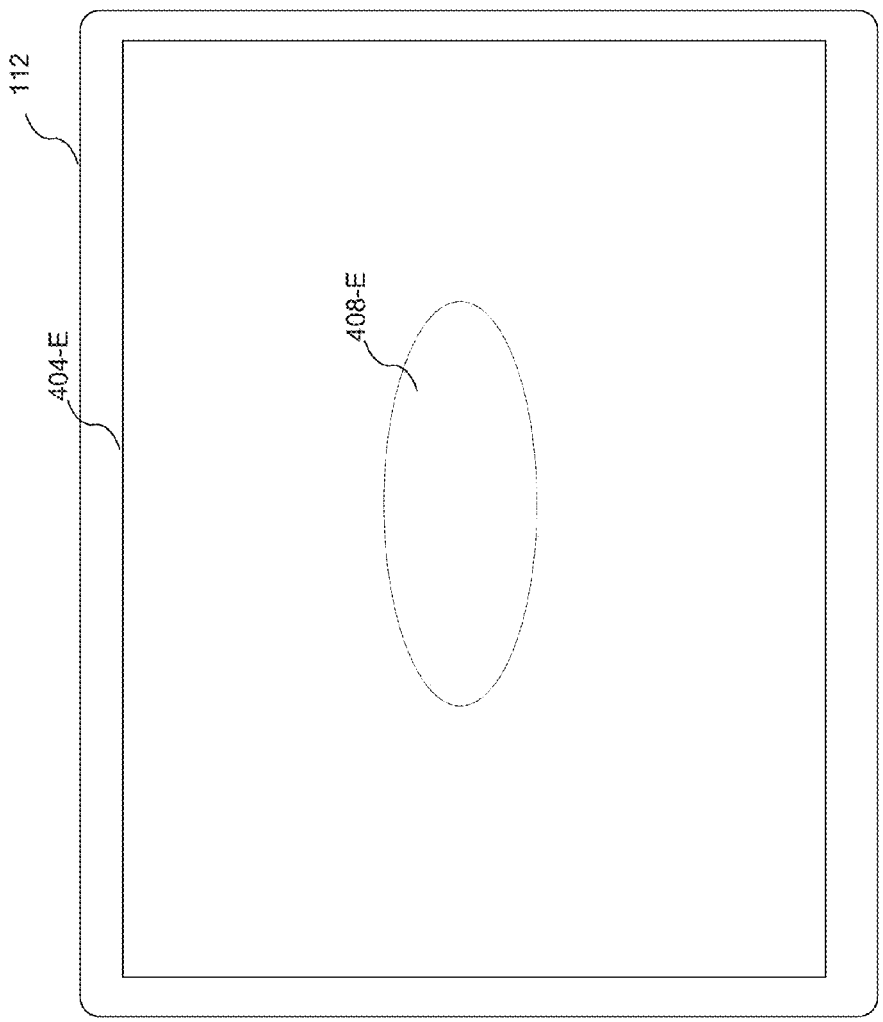
Figure 4E:
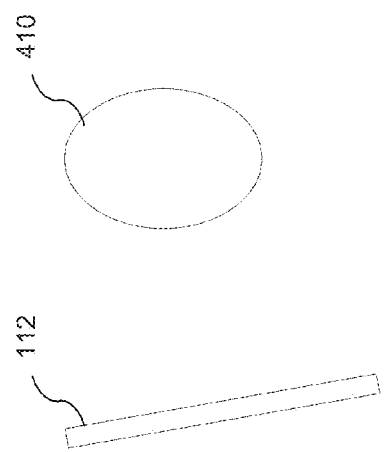
Figure 4F:
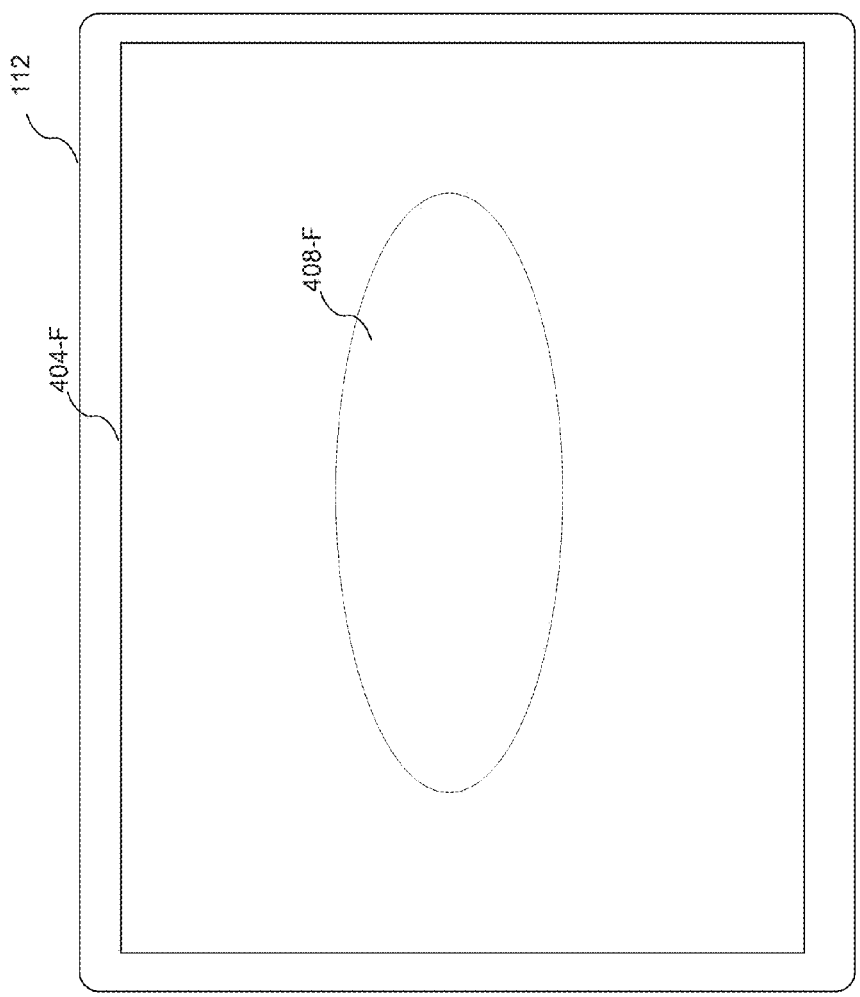
Figure 4F:
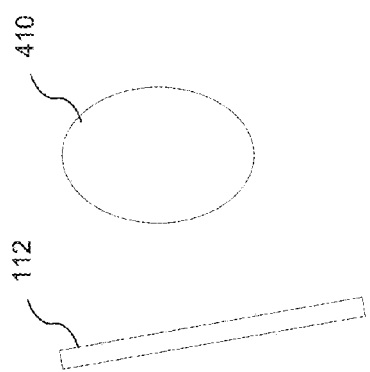
Figure 4G:
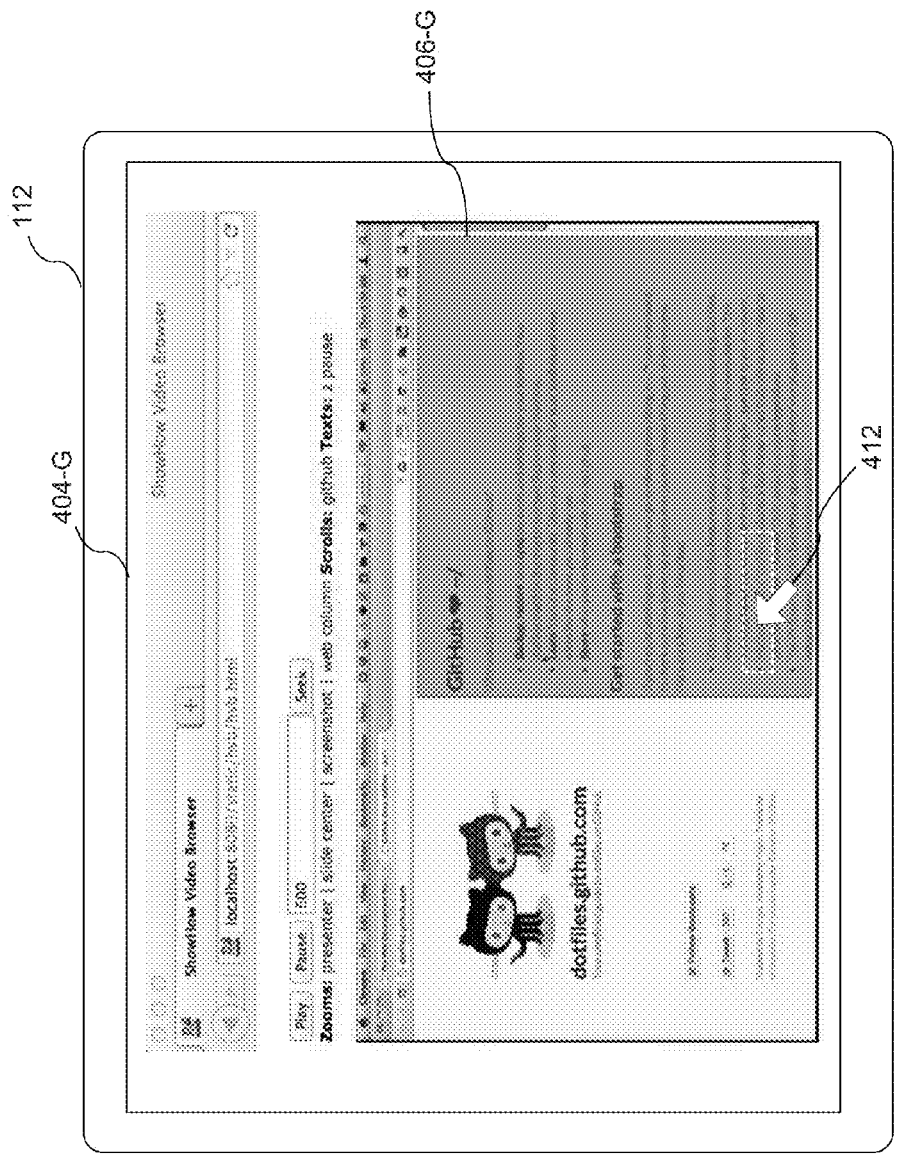
Figure 4H:
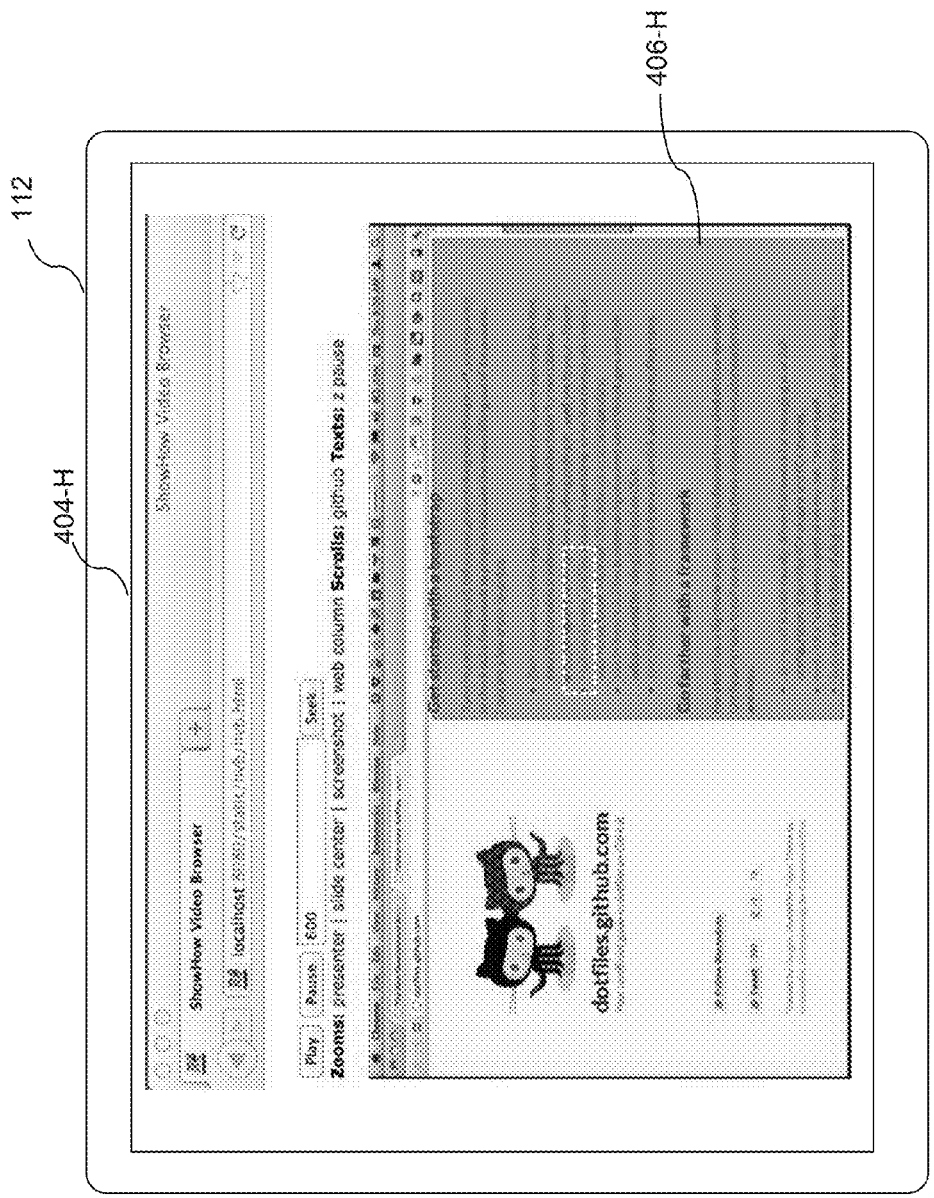
Figure 4I:
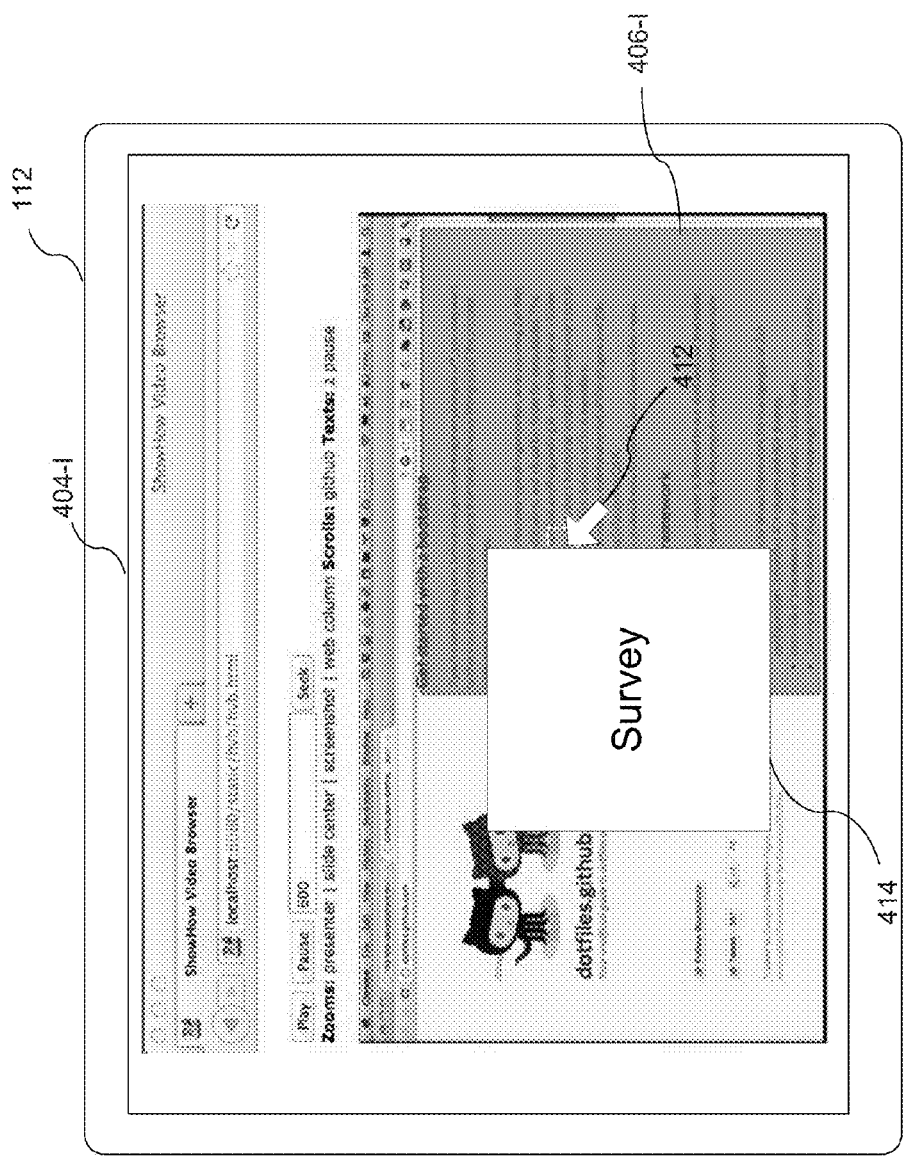
Figure 4J:
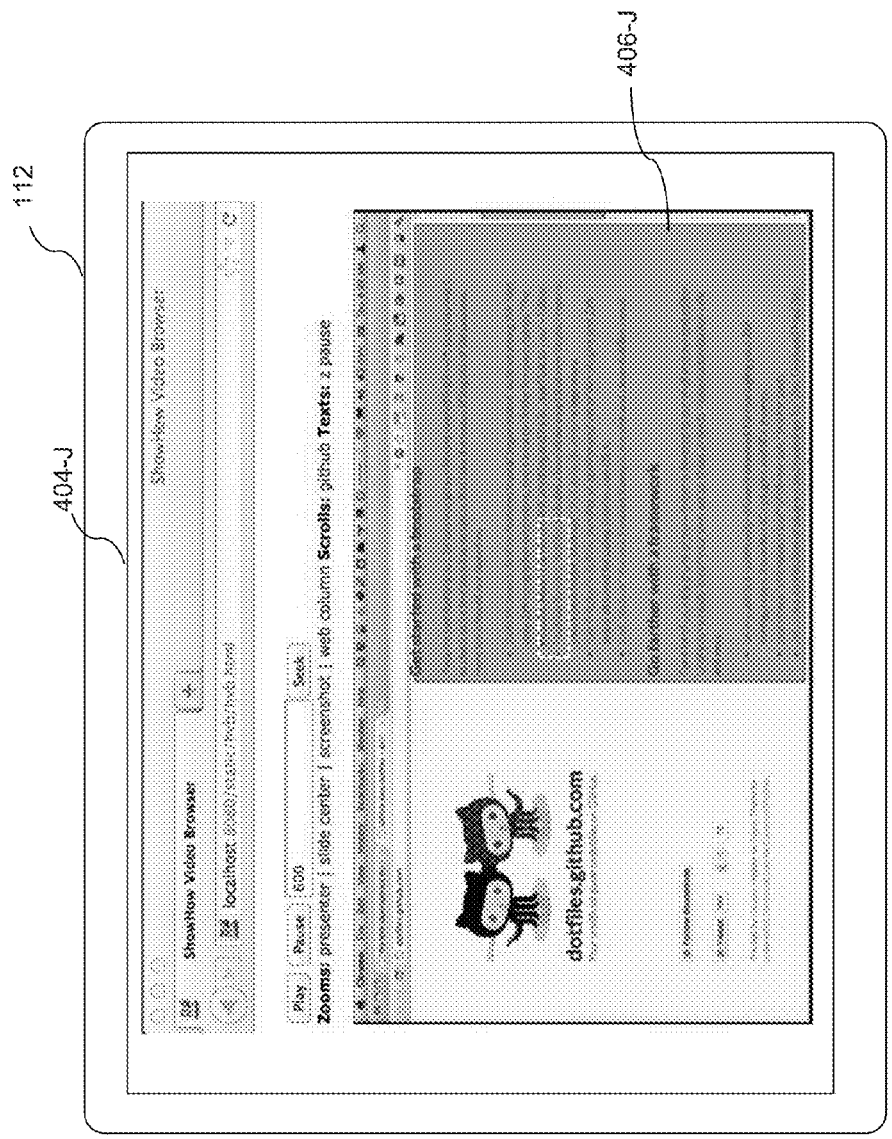
Figure 4K:
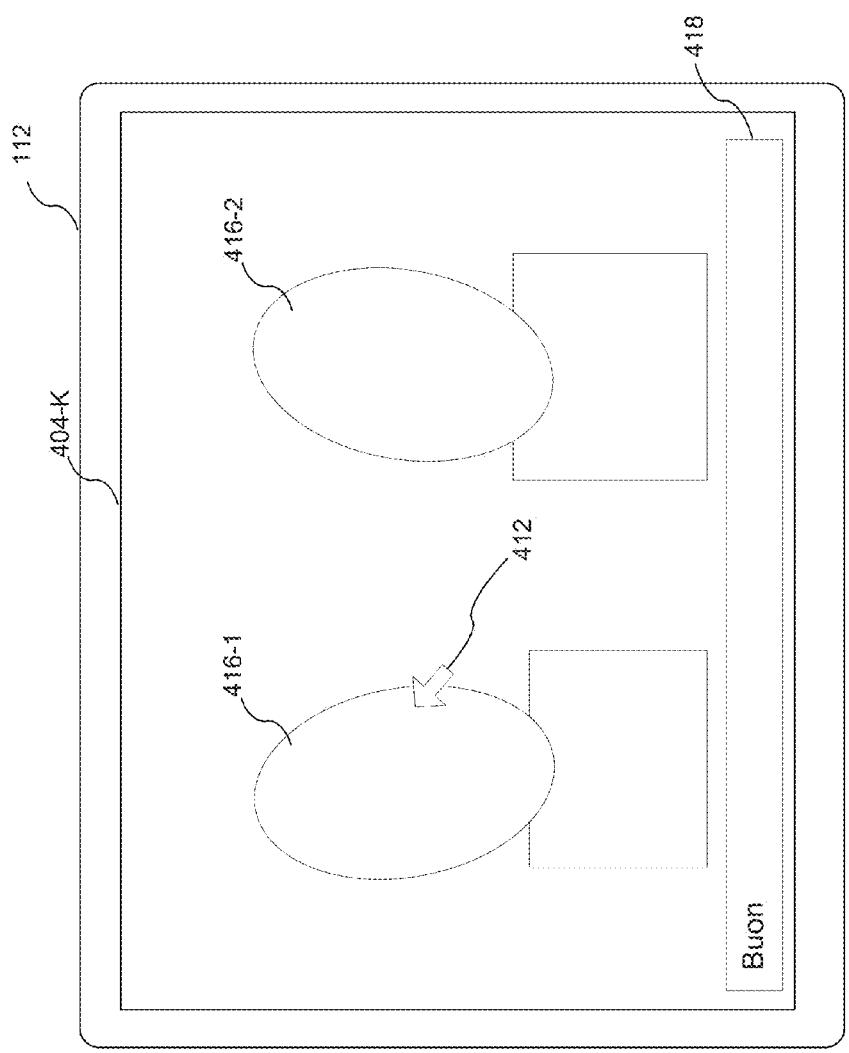
Figure 4N:
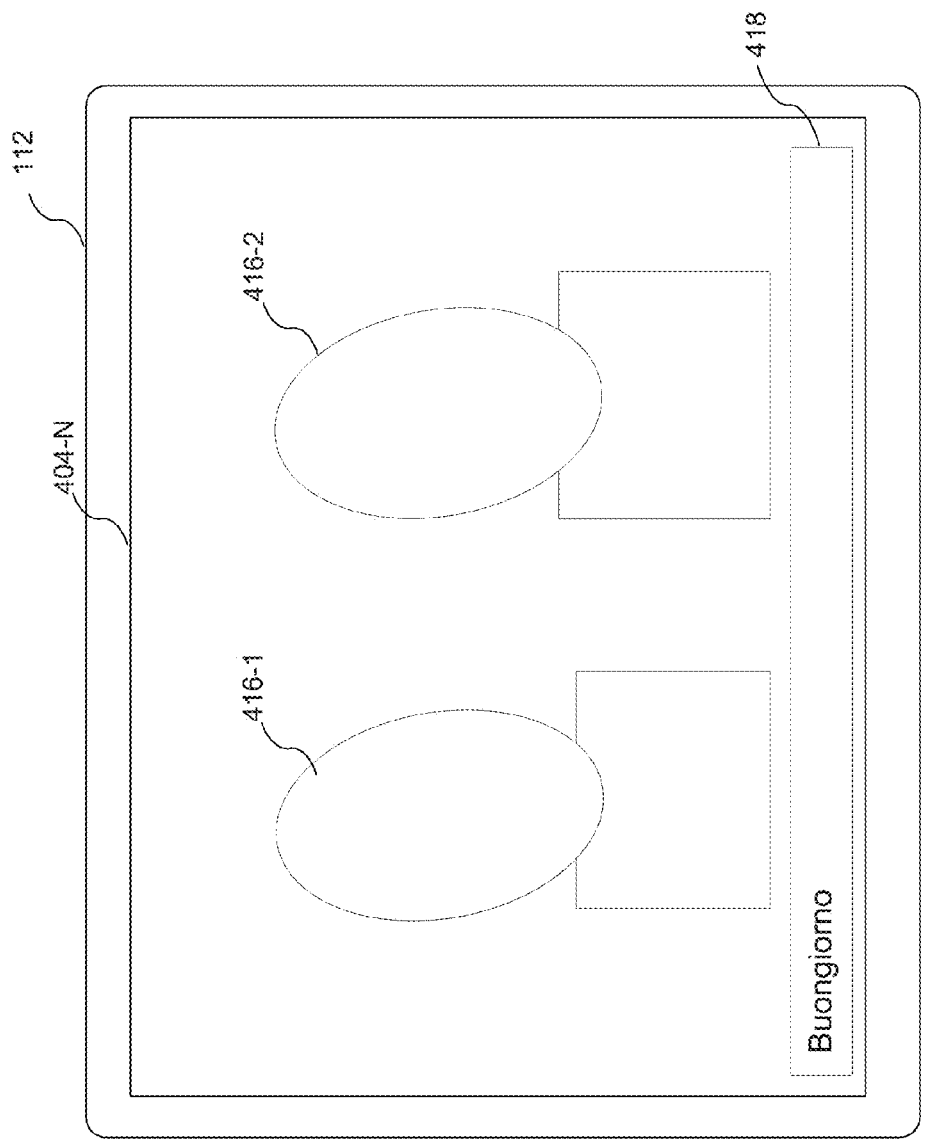
Figure 4O:
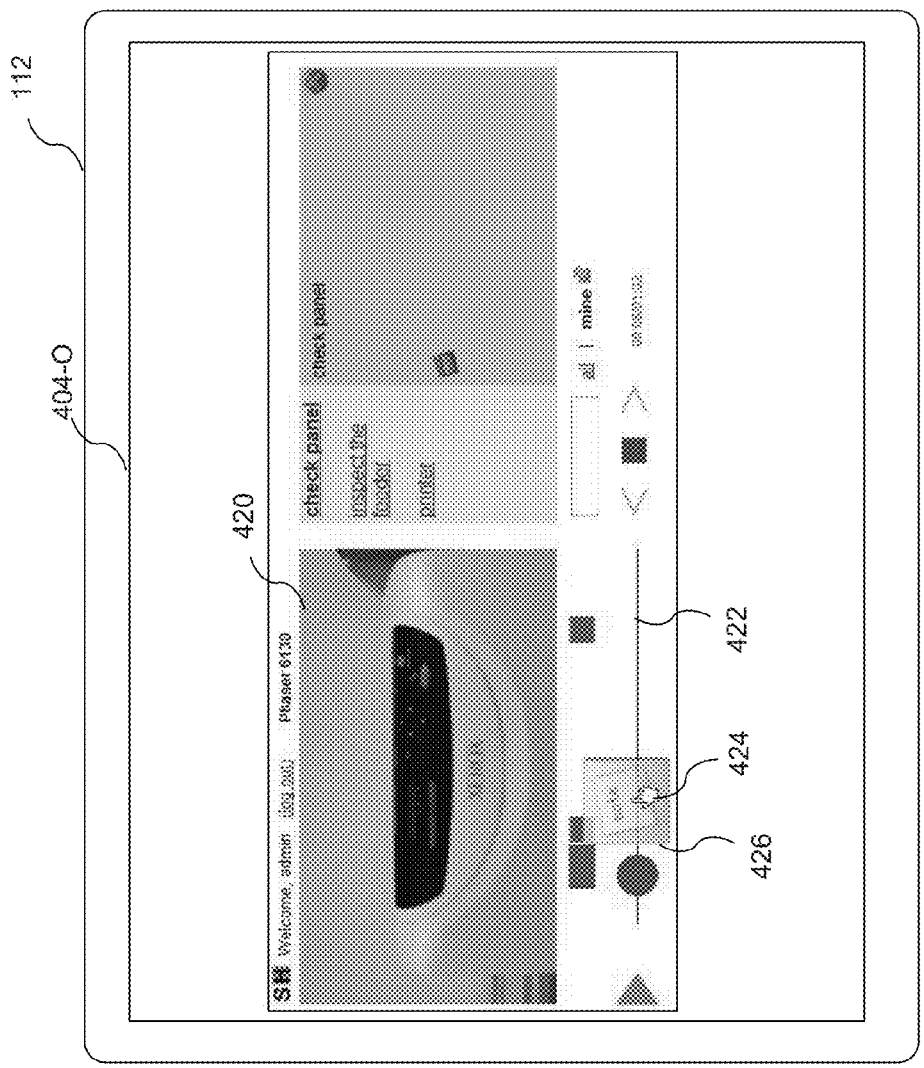
Figure 4P:
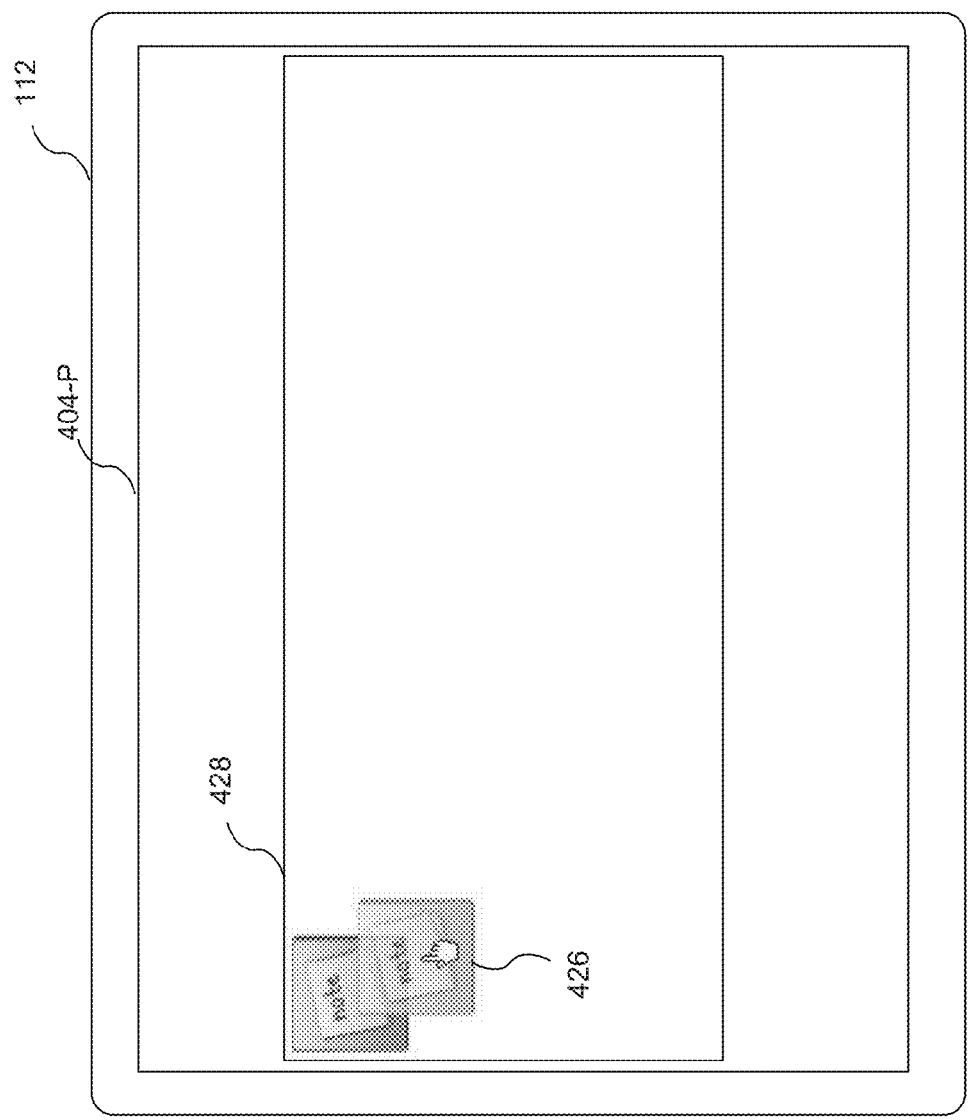
Figure 4Q:
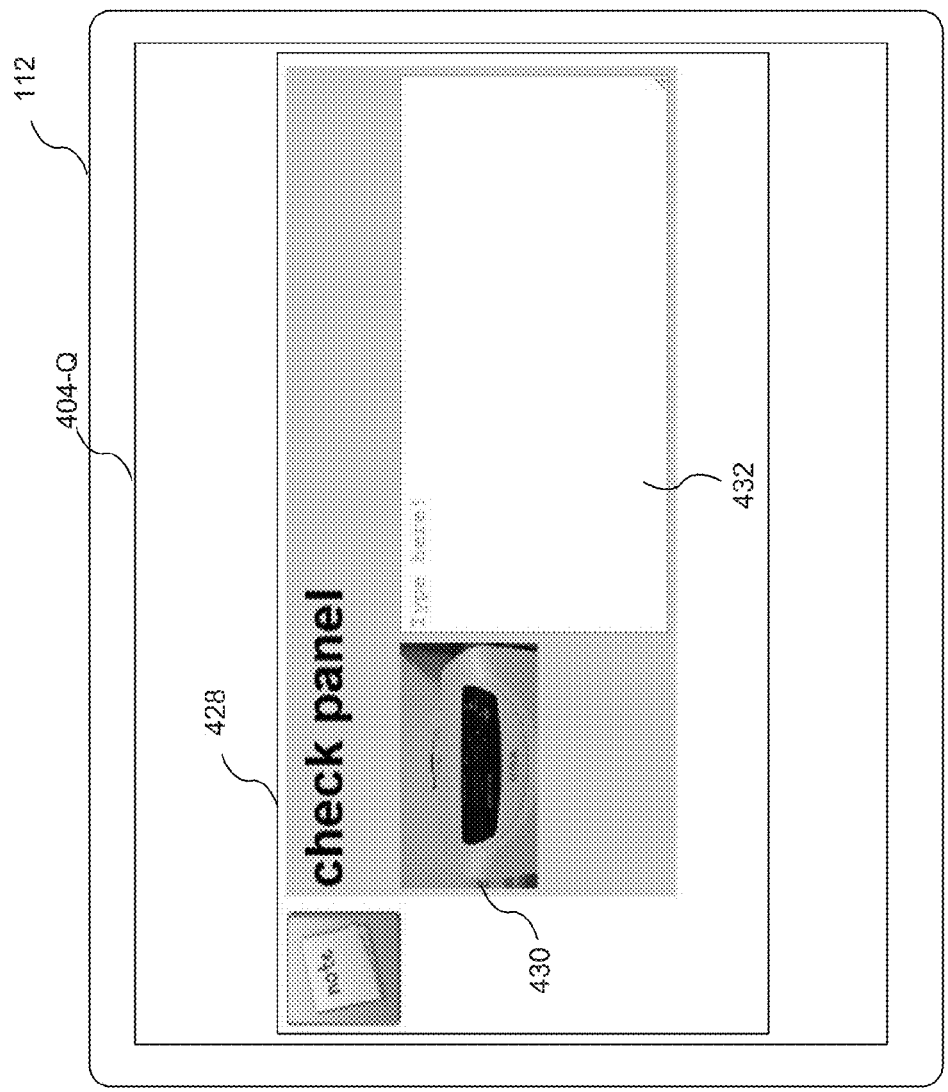
Figure 4R:
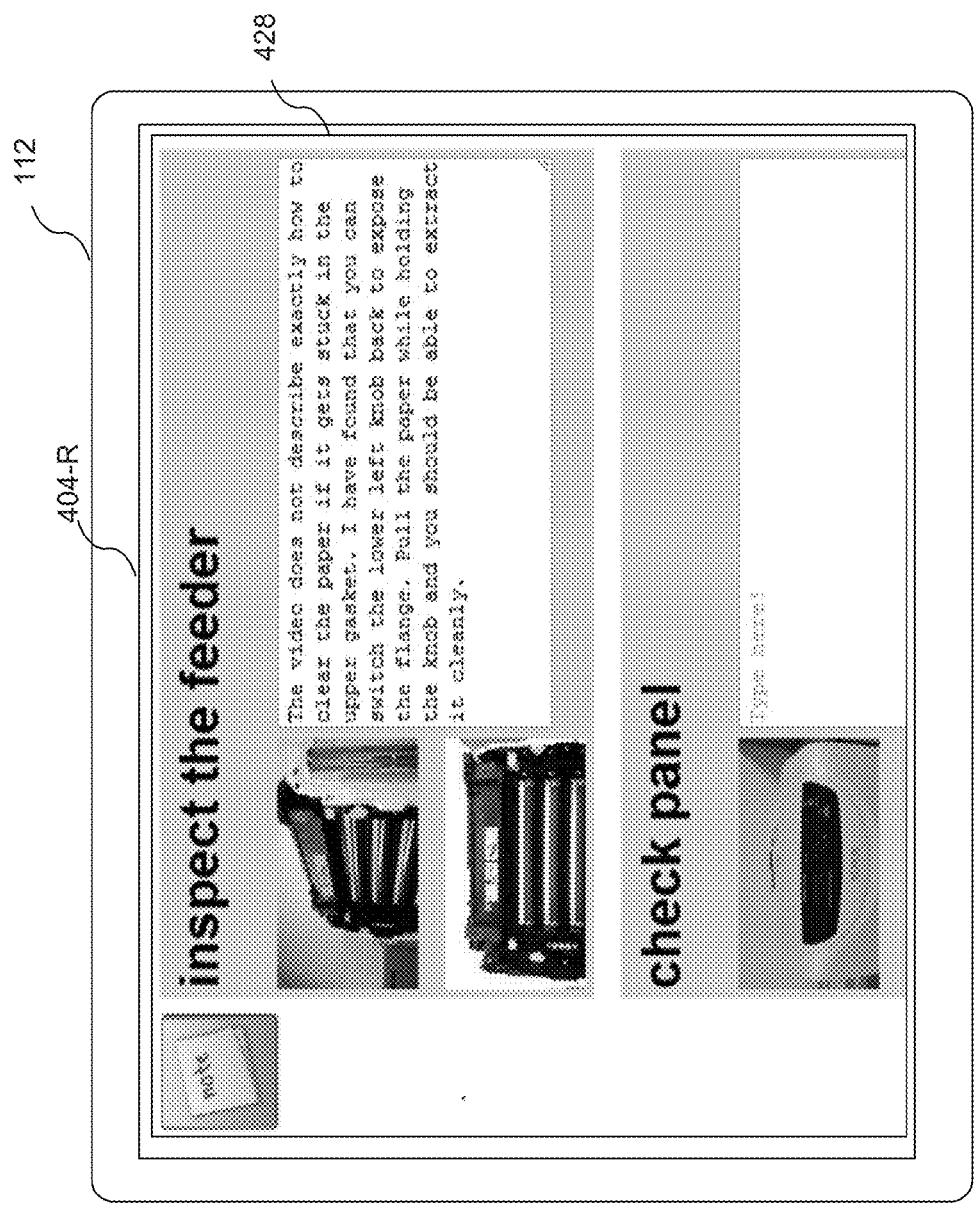
Figure 5A:
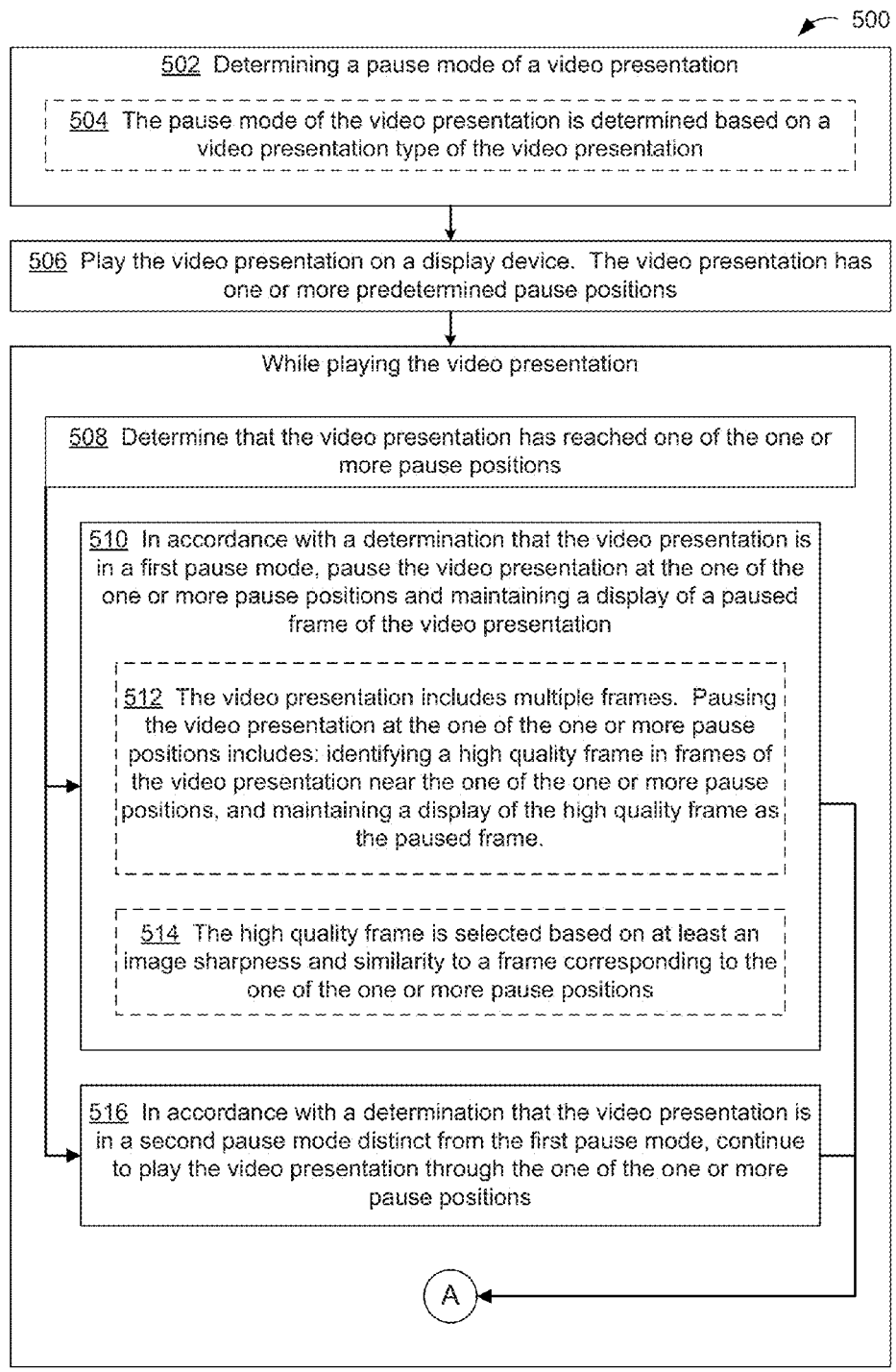
FIGS. 5A-5E is a flowchart representing a method for rendering a user interface object in accordance with a variable scaling factor, in accordance with some implementations.
Figure 5B:
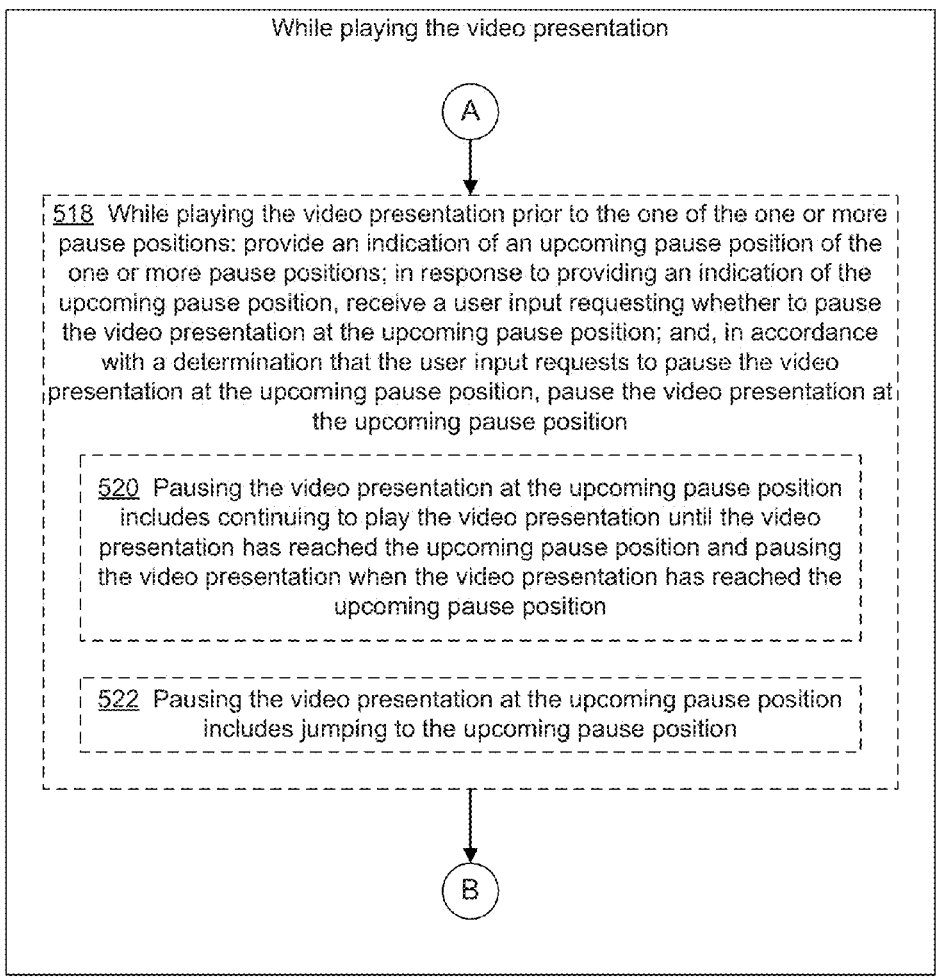
Figure 5C:
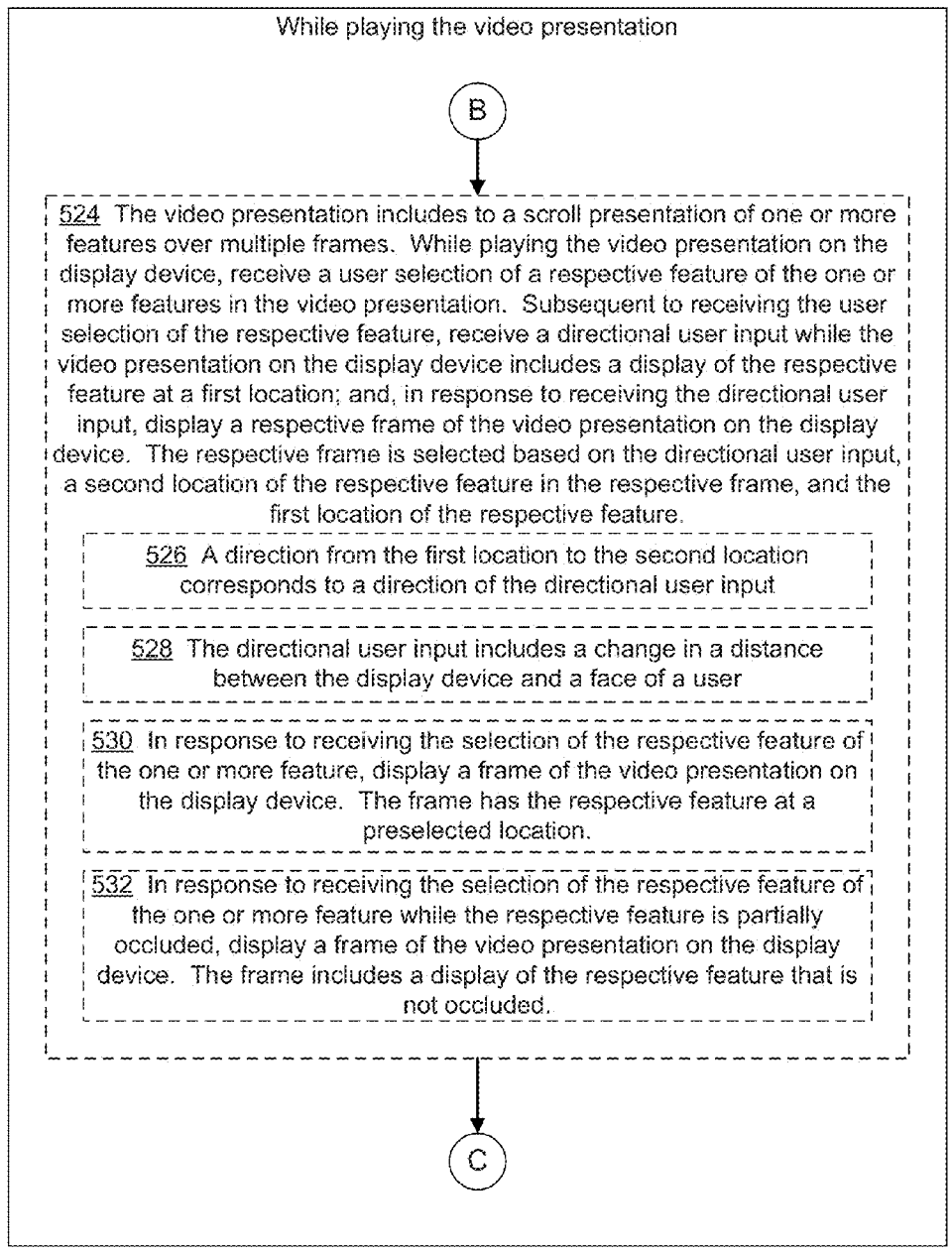
Figure 5D:
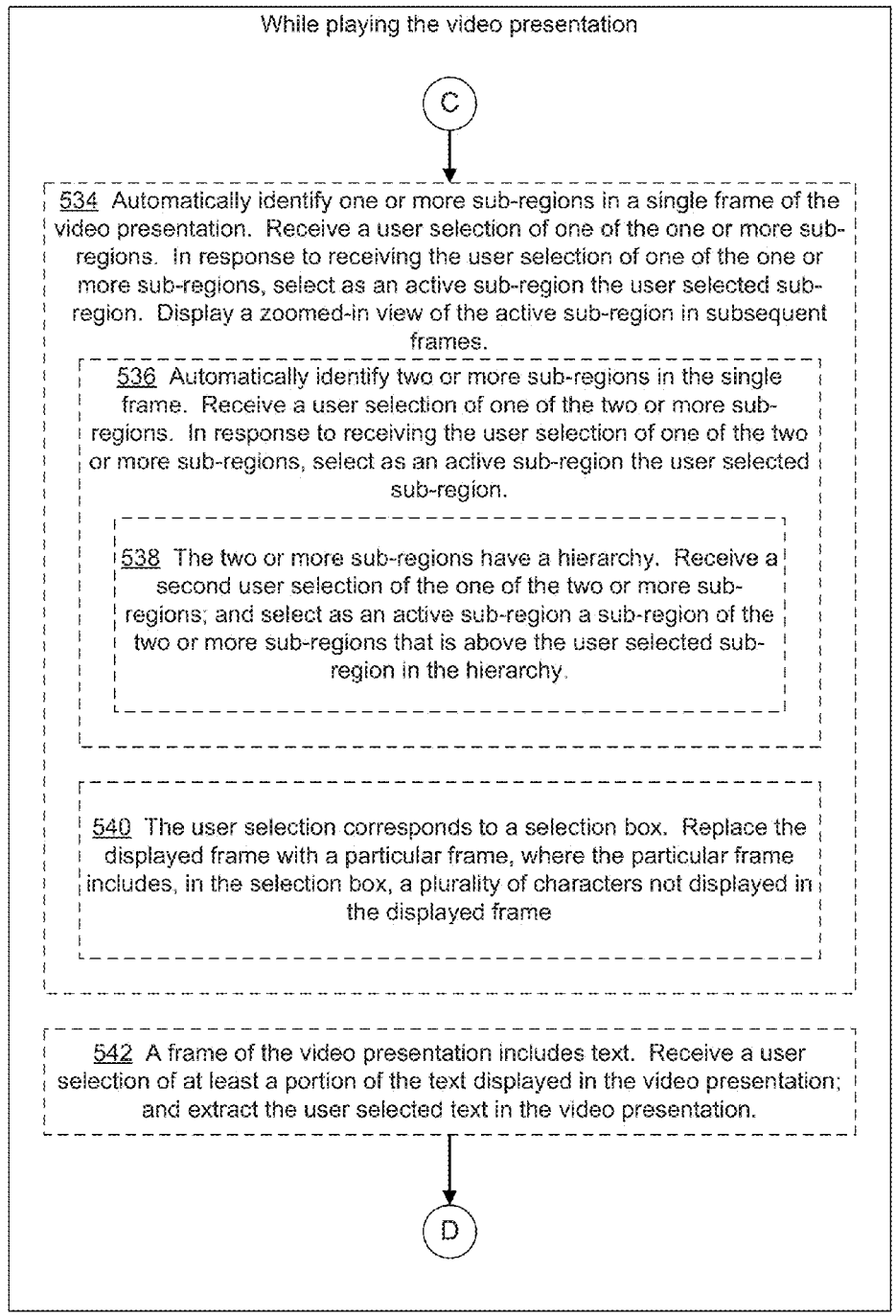
Figure 5E:
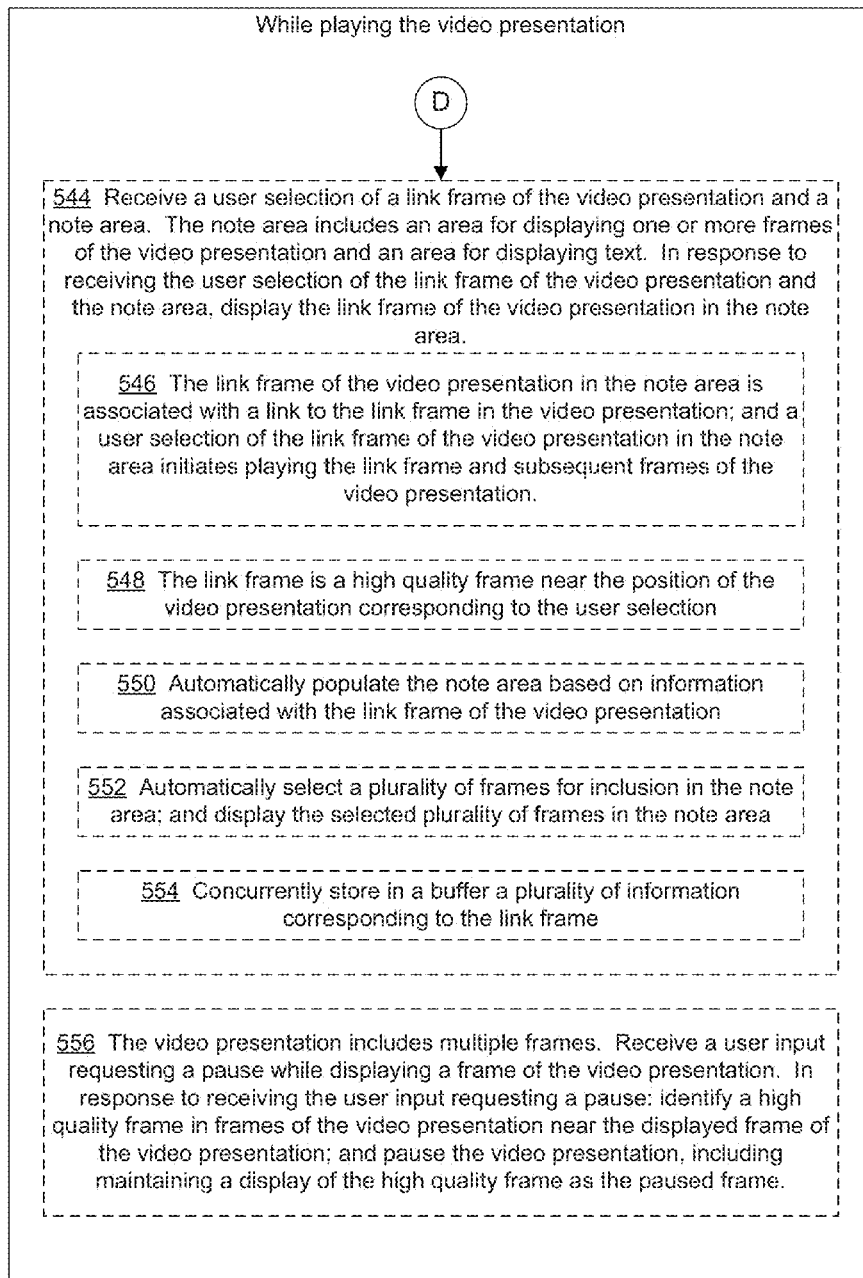

FIGS. 4A-4R illustrate example user interfaces displayed on the display device 112 in accordance with some implementations.

FIGS. 4A-4C illustrate example user interfaces associated with a scrubbing operation in accordance with some implementations.

In FIG. 4A, the display device 112 displays a user interface 404-A of a video presentation that includes a portion of a text document 406-A. The displayed portion of the text document 406-A includes a header "Get started with a bootstrap." The displayed portion of the text document 406-A is scrolled.

FIG. 4B illustrates that a different portion of the text document 406-B is displayed in the user interface 404-B as a result of the scroll operation. Compared to the portion of the text document 406-A, the position of the header "Get started with a bootstrap" is scrolled up in the portion of the text document 406-B. The portion of the text document 406-B also includes a header "Go farther with a framework." The displayed portion of the text document 406-B is scrolled further.

FIG. 4C illustrates that yet another portion of the text document 406-C is displayed in the user interface 404-C as a result of the further scroll. The header "Get started with a bootstrap" is scrolled to the top of the portion of the text document 406-C. The header "Go farther with a framework" is also scrolled up.

In some implementations, when a user provides a directional input, a frame is selected at least based on the direction of the directional input, and the selected frame is displayed. For example, when a user selects a down arrow button while the portion of the text document 406-C is displayed, the portion of the text document 406-A or the portion of the text document 406-B may be displayed. In this implementation, the selection of the down arrow button has the visual effect of causing the header "Get started with a bootstrap" to scroll down. In another example, when a user selects an up arrow button while the portion of the text document 406-C is displayed, the portion of the text document 406-A or the portion of the text document 406-B may be displayed. In this implementation, the selection of the up arrow button has the visual effect of scrolling toward the top portion of the text document.

FIGS. 4D-4F illustrate example user interfaces associated with scrubbing operation in accordance with some other implementations.

FIG. 4D illustrates on the left hand side that a face of a user 410 and the display device 112. FIG. 4D also illustrates on the right hand side the user interface 404-D displayed on the display device 112. The user interface 404-D includes a display of an object 408-D.

In FIG. 4E, a zoomed-out view of the object 408-E is displayed on the display device 112.

FIG. 4F illustrates on the left hand side that the face of the user 410 has moved toward the display device 112. In response, a frame in which the object is displayed in a larger scale is displayed on the display device 112. In some cases, moving the face of the user 410 closer to the display device 112 displays a zoomed-in view of an object, and moving the face of the user 410 away from the display device 112 displays a zoomed-out view of the object. In some other cases, moving the face of the user 410 closer to the display device 112 displays a zoomed-out view of an object, and moving the face of the user 410 away from the display device 112 displays a zoomed-in view of the object.

FIGS. 4G-4H illustrate example user interfaces associated with user selection of a displayed feature in accordance with some implementations.

In FIG. 4G, the display device 112 displays a user interface 404-G that includes a portion of a text document 406-G. FIG. 4G also illustrates that a user selects a feature (e.g., a portion of a text) with a mouse click while a cursor 412 is located over the feature. Although the user selection is described herein based on a mouse click, any other input methods can be used to select a feature displayed on the display device 112.

FIG. 4H illustrates that, in response to the user selection of the feature, a frame that has the feature located at a predefined position is selected and displayed.

FIGS. 4I-4J illustrate example user interfaces associated with user selection of a displayed feature in accordance with some other implementations.

In FIG. 4I, the feature is partially occluded by another user interface object 414 (e.g., a pop-up window). FIG. 4I also illustrates that the user selects the feature with a mouse click while the cursor 412 is located over the feature.

FIG. 4J illustrates that, in response to the user selection of the feature, a frame that has a non-occluded view of the feature is selected and displayed.

FIGS. 4K-4L illustrate example user interfaces associated with user selection of a displayed feature in accordance with some implementations.

FIG. 4K illustrates that the display device 112 displays a user interface 404-K that depicts a conversation between two people 416-1 and 416-2. FIG. 4K illustrates that the user selects a face of the person 416-1 with a mouse click while the cursor 412 is located over the face of the person 416-1.

In FIG. 4L, in response to the user selection of the face of the person 416-1, the zoomed-in view of the face of the person 416-1 is displayed in the user interface 404-L of the display device 112.

FIG. 4M is similar to FIG. 4K. However, FIG. 4M illustrates that the user selects a text box 418 that displays a caption with a mouse click while the cursor 412 is located over the text box 418. In FIG. 4K, the text box has only four characters "Buon."

In FIG. 4N, in response to the user selection of the text box 418, a frame that contains additional characters in the text box 418 is selected and displayed. In some implementations, a frame that contains the most characters in the text box 418 is selected. In some implementations, the text box 418 in the selected frame includes characters contained in the text box 418 in the frame when the text box 418 was selected by the user. For example, when the text box 418 contains the four characters "Buon," a frame in which the text box 418 contains "Buongiorno" can be selected because "Buongiorno" includes the characters "Buon." However, a frame in which the text box 418 contains "Che piacere vederti" is not selected even though the phrase "Che piacere vederti" contains more characters than the term "Buongiorno," because "Che piacere vederti" does not include the characters "Buon."

In some implementations, the text in the text box 418 (e.g., "Buongiorno") is copied into a memory of a computer system. The copied text may be pasted into another application.

FIGS. 4O-4R illustrate example user interfaces associated with drag-and-drop based note taking in accordance with some implementations.

FIG. 4O illustrates that the display device 112 displays a user interface 404-O including a display of a video presentation 420 and a progress bar 422. FIG. 4O also illustrates that a user drags a position on the progress bar 422. In some implementations, the dragged position starts from one of the bookmarks. For example, the user may move a cursor 424 over the progress bar 422, press down on a mouse button, and move the mouse while the mouse button is pressed down. In some implementations, the dragged position starts from a current position indicator. In some implementations, the dragged position starts from anywhere on the progress bar 422. In some implementations, in response to a user dragging a position on the progress bar 422, the video presentation 420 is paused. In some implementations, in response to the user dragging a position on the progress bar 422, an icon 426 is displayed adjacent to the cursor 424.

In some implementations, dragging the icon 426 copies information into a buffer of a computer system. The information may include one or more of: a key frame image (e.g., a thumbnail image corresponding to the dragged position of the video presentation 420), a title, a link to the dragged position of the video presentation 420, and other metadata (e.g., caption texts, bookmark information, etc.).

FIG. 4P illustrates that the dragged icon 426 is dropped into a different view 428. The view 428 may be a view of an application that includes the display of the video presentation 420. Alternatively, the view 428 may be a view of a different application.

In FIG. 4Q, in response to dropping the icon 426 into the different view, a note is automatically generated in the view 428. The note area in the view 428 includes an area 430 for displaying one or more frames of the video presentation and an area 432 for displaying text. In some implementations, the note is automatically populated with a title and a keyframe image. In some implementations, the keyframe image includes a link (e.g., hypertext link) to a position of the video presentation 420 where the icon 426 was dragged from.

FIG. 4R illustrates that, in some implementations, instead of a single key frame image, multiple key frame images are displayed in the view 428. In some implementations, the note is populated with a corresponding text from a transcript or caption of the video presentation 420.

FIGS. 5A-5E are flowcharts representing a method 400 for navigating instructional video presentations, in accordance with some implementations. The method is performed at a computer system (e.g., the computer system 200, FIG. 2). The computer system includes one or more processors (e.g., the CPU(s) 202, FIG. 2) and memory (e.g., the memory 206) storing one or more programs, for execution by the one or more processors, for navigating instructional video presentations.

The system determines (502) a pause mode of a video presentation. For example, the pause mode may be preselected by a user of the system. In one example, the pause mode may be one of: a mode for pausing at every predetermined pause position (e.g., FIG. 3A(1)), a mode for ignoring predetermined pause positions (e.g., FIG. 3A(2)), and a mode for pausing based on a user input (e.g., FIG. 3A(3)).

In some implementations, the pause mode of the video presentation is determined (504) based on a video presentation type of the video presentation. For example, when the video presentation has a video presentation type corresponding to instructional video presentations, a pause mode corresponding to FIG. 3A(1) may be selected. Alternatively, when the video presentation has a video presentation type corresponding to exercise routines, a pause mode corresponding to FIG. 3A(2) may be selected. In some implementations, determining the video presentation type of the video presentation includes determining a genre of the video presentation. For example, if the genre of the video presentation is education, the pause mode corresponding to FIG. 3A(1) may be selected. If the genre of the video presentation is action movie, the pause mode corresponding to FIG. 3A(2) may be selected. In some implementations, the video presentation type of the video presentation is included in the video presentation as metadata.

The system plays (506) the video presentation on a display device, wherein the video presentation has one or more predetermined pause positions (e.g., 308-1 through 308-3, 310-1 through 310-3, and 312-1 through 312-3 in FIG. 3A). Note that the preceding statement that the video presentation "has one or more predetermined pause positions" does not necessarily mean that the video file (or files) corresponding to the video presentation includes the pause position information (though this is the case in some implementations). Rather, in some implementations, the pause position information is maintained separately from the video file for the video presentation associated with that pause position information. For example, in some implementations, the pause positions are maintained and managed on one computer system (e.g., the computer system 114 in FIG. 1) and the video file is maintained as a separate file on a separate media server (e.g., one or more of the content providers 102 in FIG. 1). In such an implementation, playing the video presentation (506) includes the computer system 114 sending playback and pause instructions to the media server, receiving from the media server a video stream corresponding to the video presentation as it is played by the media server in accordance with the instructions, and displaying the received stream on the display device 112. In some implementations, the playback and pause instructions sent by the computer system 114 are based on, without limitation, one or more of: the current playback position of the video presentation, the current pause mode (e.g., one of the above-described pause modes), predetermined pause positions, and user-issued playback and/or pause commands. In some implementations, the pause positions and the video file for a respective video presentation are provided by the same computer system (e.g. the computer system 200 in FIG. 2) but are maintained and managed separately. In such an implementation, the computer system 200 may employ the media player 220 and the pause module 124 to play the video presentation in accordance with the predetermined pause positions and pause operations.

While playing the video presentation, the system determines (508) that the video presentation has reached one of the one or more pause positions (e.g., 308-1, 310-1, or 312-1 in FIG. 3A).

The system, in accordance with a determination that the video presentation is in a first pause mode, pauses (510) the video presentation at the one of the one or more pause positions and maintaining a display of a paused frame of the video presentation. For example, if the video presentation is in a pause mode corresponding to FIG. 3A(1), the system pauses the video presentation at the pause position 308-1.

In some implementations, the video presentation includes (512) multiple frames. Pausing the video presentation at the one of the one or more pause positions includes identifying a high quality frame in frames of the video presentation near the one of the one or more pause positions (e.g., FIG. 3B), and maintaining a display of the high quality frame as the paused frame. In some implementations, the frames near the one of the one or more pause positions include a first predefined number of frames preceding the one of the one or more pause positions and a second predefined number of frames subsequent to the one of the one or more pause positions.

In some implementations, the high quality frame is selected (514) based on at least image sharpness and similarity to a frame corresponding to the one of the one or more pause positions. Selection of the high quality frame based on the image sharpness and the image similarity is described above with respect to FIG. 3B, and not repeated here for brevity.

The system, in accordance with a determination that the video presentation is in a second pause mode distinct from the first pause mode, continues (516) to play the video presentation through the one of the one or more pause positions. For example, in accordance with the determination that the video presentation is in the second pause mode, the system foregoes pausing the video presentation at the one of the one or more pause positions. For example, if the video presentation is in a pause mode corresponding to FIG. 3A(2), the system continues to play the video presentation through the pause position 310-1.

In some implementations, while playing the video presentation prior to the one of the one or more pause positions, the system provides (518) an indication of an upcoming pause position of the one or more pause positions (e.g., at the indication position 314-1 in FIG. 3A). In some implementations, the indication is an audible indication. In some implementations, the indication is a visual indication. In some implementations, the indication is provided when the upcoming pause position is within a predefined time or length criteria from a current play position. The system, in response to providing an indication of the upcoming pause position, receives a user input requesting whether to pause the video presentation at the upcoming pause position; and, in accordance with a determination that the user input requests to pause the video presentation at the upcoming pause position, pauses the video presentation at the upcoming pause position.

In some implementations, pausing the video presentation at the upcoming pause position includes (520) continuing to play the video presentation until the video presentation has reached the upcoming pause position and pausing the video presentation when the video presentation has reached the upcoming pause position.

In some implementations, pausing the video presentation at the upcoming pause position includes (522) jumping to the upcoming pause position. For example, in response to receiving the user input requesting to pause the video presentation at the upcoming pause position, the system foregoes playing a portion of the video presentation prior to the upcoming pause position and jumps to the upcoming pause position.

In some implementations, the video presentation includes to a scroll presentation of one or more features over multiple frames (e.g., FIGS. 4A-4C). While playing the video presentation on the display device, the system receives (524) a user selection of a respective feature of the one or more features in the video presentation (e.g., the header "Get started with a bootstrap" in FIG. 4A). Subsequent to receiving the user selection of the respective feature, the system receives a directional user input while the video presentation on the display device includes a display of the respective feature at a first location (e.g., a selection of an up, down, left, or right arrow, a mouse movement in the up, down, left, or right direction, etc.). The system, in response to receiving the directional user input, displays a respective frame of the video presentation on the display device. The respective frame is selected based on the directional user input, a second location of the respective feature in the respective frame, and the first location of the respective feature. For example, when an up arrow is selected, a frame in which the respective feature is located above the first location is selected. Alternatively, when an up arrow is selected, a frame in which the respective feature is located below the first location may be selected.

In some implementations, a distance from the first location of the respective feature to the location of the respective feature in the respective frame corresponds to a predetermined distance. In some implementations, a distance from the first location of the respective feature to the location of the respective feature in the respective frame corresponds to a length associated with the directional user input. For example, in some implementations, when a mouse moves further, the location of the respective feature is further away from the first location.

In some implementations, a direction from the first location to the second location corresponds (526) to a direction of the directional user input. For example, when an up arrow is selected, a frame in which the respective feature is located above the first location is selected.

In some implementations, the directional user input includes (528) a change in a distance between the display device and a face of a user (e.g., when the video presentation includes a zoom-in or zoom-out of one of the one or more features, moving the user's face toward the display device initiates a display of a zoomed-in or zoomed-out view as illustrated in FIGS. 4E-4F).

In some implementations, in response to receiving the selection of the respective feature of the one or more feature, the system displays (530) a frame of the video presentation on the display device, the frame having the respective feature at a preselected location (e.g., FIGS. 4G-4H).

In some implementations, the system, in response to receiving the selection of the respective feature of the one or more feature while the respective feature is partially occluded, displays (532) a frame of the video presentation on the display device. The frame includes a display of the respective feature that is not occluded (e.g., FIGS. 4I-4J).

In some implementations, while playing the video presentation on the display device, the system automatically identifies (534) one or more sub-regions in a single frame of the video presentation (e.g., based on one or more of: edge detection, color segmentation, and motion detection in multiple frames). The system receives a user selection of one of the one or more sub-regions, and, in response to receiving the user selection of one of the one or more sub-regions, selects as an active sub-region the user selected sub-region. The system displays a zoomed-in view of the active sub-region in subsequent frames (e.g., FIGS. 4K-4L).

In some implementations, while playing the video presentation on the display device, the system automatically identifies (536) two or more sub-regions in the single frame (e.g., in FIGS. 4K-4L, the persons 416-1 and 416-2 and the text box 418 can be identified as sub-regions). The system receives a user selection of one of the two or more sub-regions, and, in response to receiving the user selection of one of the two or more sub-regions, selects as an active sub-region the user selected sub-region.

In some implementations, the two or more sub-regions have (538) a hierarchy. The system receives a second user selection of the one of the two or more sub-regions; and selects as an active sub-region a sub-region of the two or more sub-regions that is above the user selected sub-region in the hierarchy. For example, in some implementations, when a small sub-region is laid over a large sub-region, the large region is above the small region in a hierarchy of the two sub-regions. When the user selects the small sub-region, the small sub-region is selected as an active sub-region. When the user selects the small sub-region again, the large sub-region is selected as an active sub-region.

In some implementations, the user selection corresponds (540) to a selection box (e.g., FIG. 4M). The system replaces the displayed frame with a particular frame. The particular frame includes, in the selection box, a plurality of characters not displayed in the displayed frame (e.g., FIG. 4N). In some implementations, at least one frame between the displayed frame and the particular frame includes, in the selection box, one more character not displayed in the displayed frame. In some implementations, the characters in the selection box are extracted. The extracted may be pasted into any other application executed by the system.

In some implementations, a frame of the video presentation includes (542) text (e.g., FIG. 4N). The system receives a user selection of at least a portion of the text displayed in the video presentation; and extracts the user selected text in the video presentation. In some implementations, the extracted text is stored in the memory. In some implementations, the extracted text is pasted into a document (e.g., a text document, a word processor document, a computer application source code, etc.).

In some implementations, while playing the video presentation on the display device, the system receives (544) a user selection of a link frame of the video presentation and a note area (FIG. 4O). The note area includes an area for displaying one or more frames of the video presentation and an area for displaying text (e.g., the areas 430 and 432 in FIG. 4Q). In some implementations, the user selection of the frame of the video presentation and the note area includes a drag-and-drop input from the video presentation to the note area while the frame is displayed (e.g., FIGS. 4O and 4P). In some implementations, the drag-and-drop input includes selecting the video presentation, moving the selected presentation or a corresponding icon onto the note area, and releasing the selected video presentation or the corresponding icon (e.g., FIG. 4O). The system, in response to receiving the user selection of the link frame of the video presentation and the note area, displays the link frame of the video presentation in the note area.

In some implementations, the link frame of the video presentation in the note area is associated (546) with a link to the link frame in the video presentation, and a user selection of the link frame of the video presentation in the note area initiates playing the link frame and subsequent frames of the video presentation. For example, in some implementations, when a user selects the frame in the area 430, the system displays the user interface 404-O (FIG. 4O) and plays the video presentation 420 at the position corresponding to the frame shown in the area 430. In some embodiments, the link includes a hypertext link.

In some implementations, the link frame is (548) a high quality frame near the position of the video presentation corresponding to the user selection. The selection of the high quality frame is discussed above with respect to FIG. 3B, and is not repeated here for brevity.

In some implementations, the system automatically populates (550) the note area based on information associated with the link frame of the video presentation (e.g., the title and the transcript or caption associated with the link frame).

In some implementations, the system automatically selects (552) a plurality of frames for inclusion in the note area (e.g., based on a segment length and/or a rate at which video content of the video presentation changes). The system displays the selected plurality of frames in the note area (e.g., FIG. 4R).

In some implementations, the system concurrently stores (554) in a buffer a plurality of information corresponding to the link frame (e.g., two or more of: a thumbnail image of the link frame, title and transcript, one or more frames, and one or more hyperlinks corresponding to the one or more frames). In some implementations, the system pastes a subset of the plurality of information corresponding to the link frame into a respective application. In some implementations, the respective application is configured to receive a subset of the plurality of information corresponding to the link frame into a respective application without receiving the entire plurality of information corresponding to the link frame into a respective application. For example, a simple text editor application may not be configured to receive thumbnail images. When the information corresponding to the link frame is pasted into the simple text editor, only text information (e.g., the title and transcript/caption) is pasted into the simple text editor, and the thumbnail image is not pasted into the simple text editor. In another example, an image editor may not be configured to receive text information. When the information corresponding to the link frame is pasted into the image editor, only the thumbnail image is pasted into the image editor, and the text information is not pasted into the image editor.

In some implementations, the video presentation includes (556) multiple frames. The system receives a user input requesting a pause while displaying a frame of the video presentation. The system, in response to receiving the user input requesting a pause: identifies a high quality frame in frames of the video presentation near the displayed frame of the video presentation; and pauses the video presentation, including maintaining a display of the high quality frame as the paused frame. In other words, the high quality frame may be used in response to a user input requesting a pause independent of predetermined pause positions. The methods for selecting a high quality image are described above with respect to FIG. 3B, and are not repeated here for brevity.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

It will be understood that, although the terms first, second, etc. have been used herein to describe various elements, these elements should not be limited by these terms. These terms are only used to distinguish one element from another. For example, a first pause mode could be termed a second pause mode, and, similarly, a second pause mode could be termed a first pause mode. The first pause mode and the second pause mode are both pause modes, but they are not the same pause mode.

The terminology used in the description of the implementations herein is for the purpose of describing particular implementations only and is not intended to be limiting of the claims. As used in the description of the embodiments and the appended claims and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

What is claimed is:

1. A method, comprising:
at a computer system with one or more processors and memory:
  determining a pause mode of a video presentation;
  playing the video presentation on a display device, wherein the video presentation has one or more predetermined pause positions; and,
  while playing the video presentation:
    determining that the video presentation has reached one of the one or more pause positions;
    in accordance with a determination that the video presentation is in a first pause mode, pausing the video presentation at the one of the one or more pause positions and maintaining a display of a paused frame of the video presentation; and
    in accordance with a determination that the video presentation is in a second pause mode distinct from the first pause mode, continuing to play the video presentation through the one of the one or more pause positions.

2. The method of claim 1, wherein the pause mode of the video presentation is determined based on a video presentation type of the video presentation.

3. The method of claim 2, wherein the video presentation type is selected from a group comprising two or more of: instructions video presentation, exercise routines, education, and action movie.

4. The method of claim 1, wherein:
the video presentation includes multiple frames; and
pausing the video presentation at the one of the one or more pause positions includes:
  identifying a high quality frame in frames of the video presentation near the one of the one or more pause positions; and
  maintaining a display of the high quality frame as the paused frame.

5. The method of claim 4, wherein the high quality frame is selected based on at least an image sharpness and similarity to a frame corresponding to the one of the one or more pause positions.

6. The method of claim 1, wherein the video presentation includes multiple frames, the method including:
receiving a user input requesting a pause while displaying a frame of the video presentation; and,
in response to receiving the user input requesting a pause:
  identifying a high quality frame in frames of the video presentation near the displayed frame of the video presentation; and pausing the video presentation, including maintaining a display of the high quality frame as the paused frame.

7. The method of claim 1, including:
while playing the video presentation prior to the one of the one or more pause positions:
providing an indication of an upcoming pause position of the one or more pause positions;
in response to providing an indication of the upcoming pause position, receiving a user input requesting whether to pause the video presentation at the upcoming pause position; and,
in accordance with a determination that the user input requests to pause the video presentation at the upcoming pause position, pausing the video presentation at the upcoming pause position.

8. The method of claim 7, wherein pausing the video presentation at the upcoming pause position includes continuing to play the video presentation until the video presentation has reached the upcoming pause position and pausing the video presentation when the video presentation has reached the upcoming pause position.

9. The method of claim 7, wherein pausing the video presentation at the upcoming pause position includes jumping to the upcoming pause position.

10. The method of claim 1, wherein the video presentation includes a scroll presentation of one or more features over multiple frames, the method including:
while playing the video presentation on the display device, receiving a user selection of a respective feature of the one or more features in the video presentation; and,
subsequent to receiving the user selection of the respective feature:
receiving a directional user input while the video presentation on the display device includes a display of the respective feature at a first location; and,
in response to receiving the directional user input, displaying a respective frame of the video presentation on the display device, the respective frame selected based on the directional user input, a second location of the respective feature in the respective frame, and the first location of the respective feature.

11. The method of claim 10, wherein a direction from the first location to the second location corresponds to a direction of the directional user input.

12. The method of claim 10, wherein the directional user input includes a change in a distance between the display device and a face of a user.

13. The method of claim 10, including:
in response to receiving the selection of the respective feature of the one or more feature, displaying a frame of the video presentation on the display device, the frame having the respective feature at a preselected location.

14. The method of claim 10, including:
in response to receiving the selection of the respective feature of the one or more feature while the respective feature is partially occluded, displaying a frame of the video presentation on the display device, the frame including a display of the respective feature that is not occluded.

15. The method of claim 1, including:
while playing the video presentation on the display device:
automatically identifying one or more sub-regions in a single frame of the video presentation;
receiving a user selection of one of the one or more sub-regions;
in response to receiving the user selection of one of the one or more sub-regions, selecting as an active sub-region the user selected sub-region; and
displaying a zoomed-in view of the active sub-region in subsequent frames.

16. The method of claim 15, including:
while playing the video presentation on the display device:
automatically identifying two or more sub-regions in the single frame;
receiving a user selection of one of the two or more sub-regions; and, in response to receiving the user selection of one of the two or more sub-regions,
selecting as an active sub-region the user selected sub-region.

17. The method of claim 16, wherein the two or more sub-regions have a hierarchy, the method including:
receiving a second user selection of the one of the two or more sub-regions; and
selecting as an active sub-region a sub-region of the two or more sub-regions that is above the user selected sub-region in the hierarchy.

18. The method of claim 15, wherein the user selection corresponds to a selection box, the method including replacing the displayed frame with a particular frame, the particular frame including, in the selection box, a plurality of characters not displayed in the displayed frame.

19. The method of claim 1, wherein a frame of the video presentation includes text, the method including:
receiving a user selection of at least a portion of the text displayed in the video presentation; and
extracting the user selected text in the video presentation.

20. The method of claim 1, including:
while playing the video presentation on the display device:
receiving a user selection of a link frame of the video presentation and a note area, the note area including an area for displaying one or more frames of the video presentation and an area for displaying text; and,
in response to receiving the user selection of the link frame of the video presentation and the note area, displaying the link frame of the video presentation in the note area.

21. The method of claim 20, wherein:
the link frame of the video presentation in the note area is associated with a link to the link frame in the video presentation; and
a user selection of the link frame of the video presentation in the note area initiates playing the link frame and subsequent frames of the video presentation.

22. The method of claim 20, wherein the link frame is a high quality frame near the position of the video presentation corresponding to the user selection.

23. The method of claim 20, including automatically populating the note area based on information associated with the link frame of the video presentation.

24. The method of claim 20, including:
automatically selecting a plurality of frames for inclusion in the note area; and
displaying the selected plurality of frames in the note area.

25. The method of claim 20, including concurrently storing in a buffer a plurality of information corresponding to the link frame.

26. The method of claim 1, wherein determining the pause mode of the video presentation includes identifying the pause mode of the video presentation from a plurality of predefined pause modes that includes the first pause mode for pausing at respective predetermined pause positions and the second pause mode for ignoring predetermined pause positions.

27. The method of claim 1, including:

determining the pause mode of the video presentation prior to determining that the video presentation has reached one of the one or more pause positions; and, in response to determining that the video presentation has reached one of the one or more pause positions:

in accordance with a determination that the video presentation is in the first pause mode, pausing the video presentation at the one of the one or more pause positions and maintaining a display of a paused frame of the video presentation; and in accordance with a determination that the video presentation is in the second pause mode distinct from the first pause mode, continuing to play the video presentation through the one of the one or more pause positions.

28. A computer system, comprising:

one or more processors; and memory storing one or more programs for execution by the one or more processors, the one or more programs including instructions for:

determining a pause mode of a video presentation;

playing the video presentation on a display device, wherein the video presentation has one or more predetermined pause positions; and, while playing the video presentation:

determining that the video presentation has reached one of the one or more pause positions;

in accordance with a determination that the video presentation is in a first pause mode, pausing the video presentation at the one of the one or more pause positions and maintaining a display of a paused frame of the video presentation; and in accordance with a determination that the video presentation is in a second pause mode distinct from the first pause mode, continuing to play the video presentation through the one of the one or more pause positions.

29. A non-transitory computer readable storage medium storing one or more programs for execution by one or more processors of a computer system, the one or more programs including instructions for:

determining a pause mode of a video presentation;

playing the video presentation on a display device, wherein the video presentation has one or more predetermined pause positions; and, while playing the video presentation:

determining that the video presentation has reached one of the one or more pause positions;

in accordance with a determination that the video presentation is in a first pause mode, pausing the video presentation at the one of the one or more pause positions and maintaining a display of a paused frame of the video presentation; and in accordance with a determination that the video presentation is in a second pause mode distinct from the first pause mode, continuing to play the video presentation through the one of the one or more pause positions.

\* \* \* \* \*